Oct. 24, 1944.  G. A. PHILBRICK  2,360,889
CONTROLLER
Filed April 7, 1943  4 Sheets-Sheet 1

INVENTOR
George A. Philbrick
BY
Blair, Curtis & Hayward
ATTORNEYS

Oct. 24, 1944.  G. A. PHILBRICK  2,360,889
CONTROLLER
Filed April 7, 1943  4 Sheets-Sheet 2
Fig. 4.
1st. COLUMN
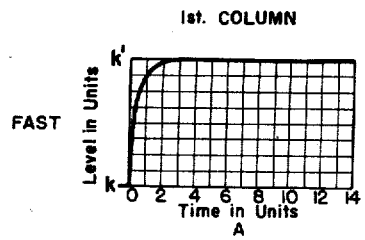
FAST
A
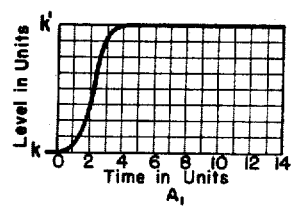
$A_1$
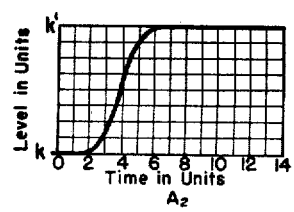
$A_2$
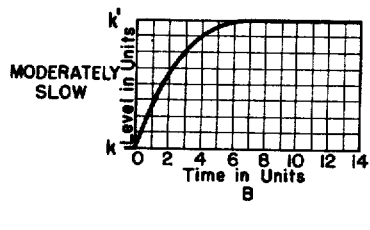
MODERATELY SLOW
B
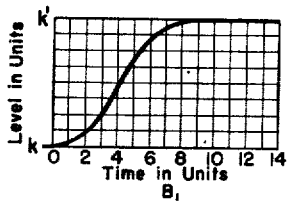
$B_1$
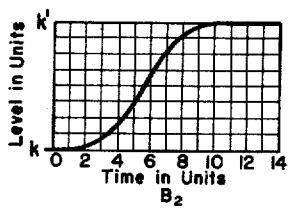
$B_2$
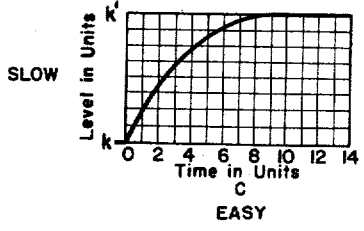
SLOW
C
EASY
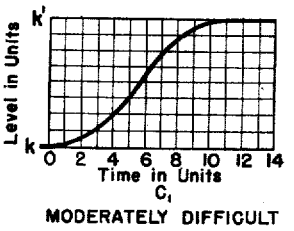
$C_1$
MODERATELY DIFFICULT
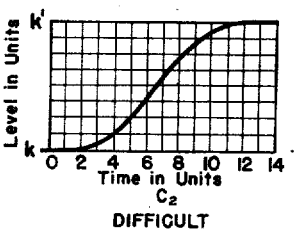
$C_2$
DIFFICULT
Fig. 7.
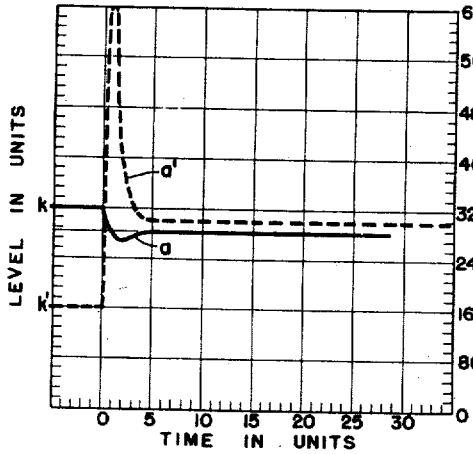
Fig. 8.
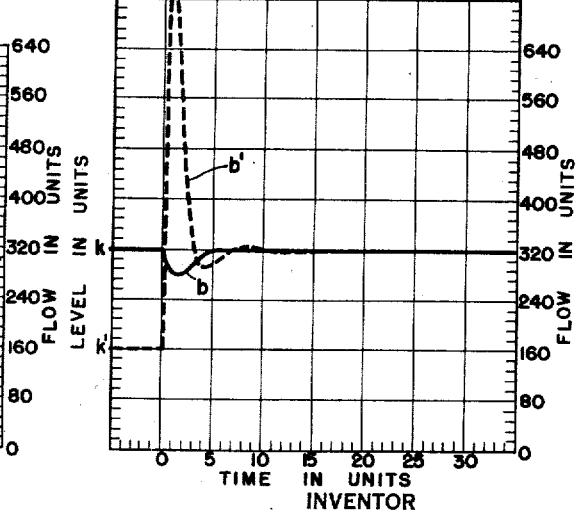
INVENTOR
George A. Philbrick
BY Blair, Curtis & Hayward
ATTORNEYS Oct. 24, 1944.  G. A. PHILBRICK  2,360,889
CONTROLLER
Filed April 7, 1943  4 Sheets-Sheet 3

INVENTOR
George A. Philbrick
BY
Blair, Curtis + Hayward
ATTORNEYS

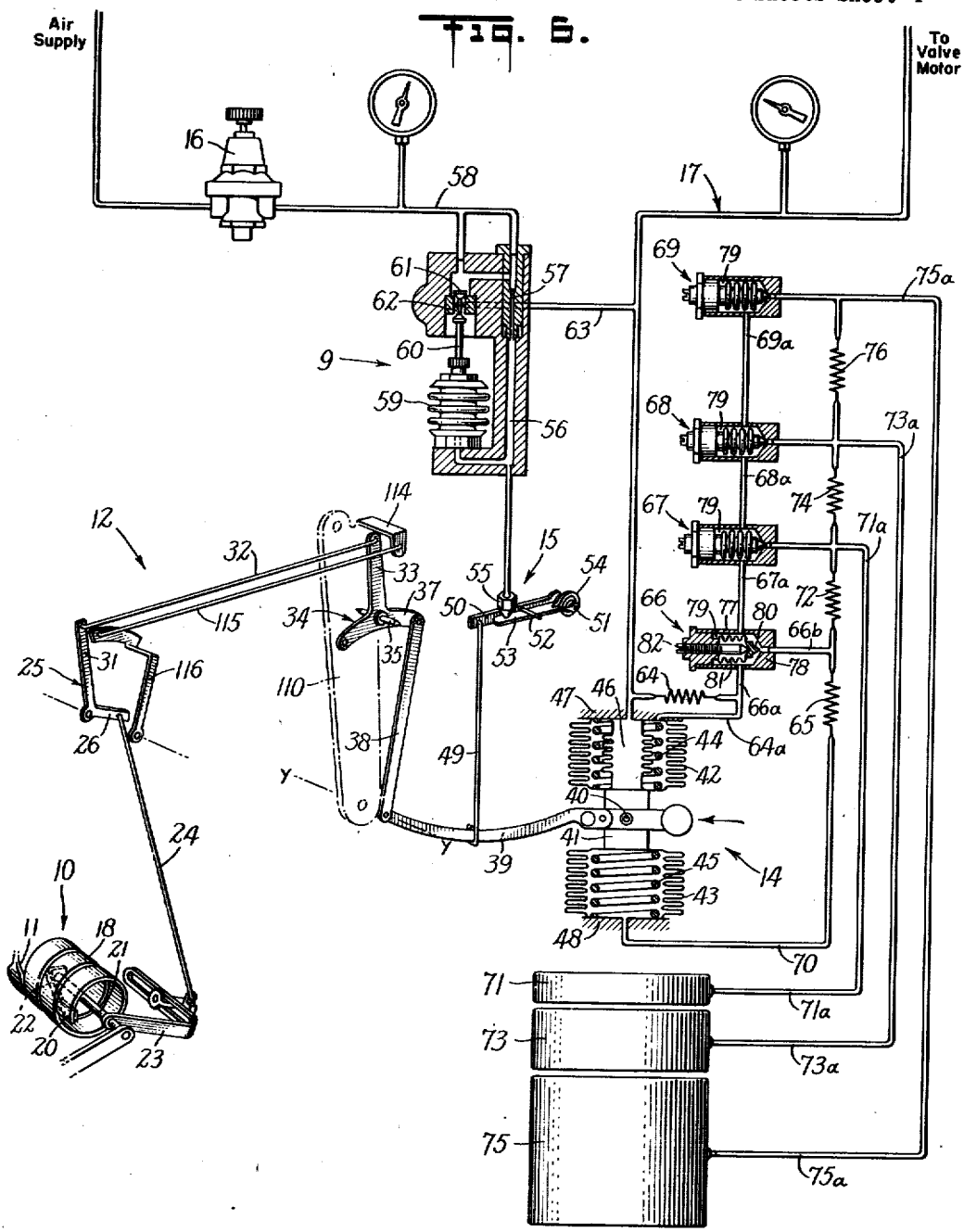

Patented Oct. 24, 1944

2,360,889

UNITED STATES PATENT OFFICE 2,360,889

CONTROLLER

George A. Philbrick, Cambridge, Mass., assignor to The Foxboro Company, Foxboro, Mass., a corporation of Massachusetts Application April 7, 1943, Serial No. 482,157

19 Claims. (Cl. 137—68)

This invention relates to the control of industrial processes and particularly to methods and apparatus for controlling industrial processes.

Referring to Figure 1, there is diagrammatically shown a process and a controller. The controller in response to the measuring element, which measures the controlled variable of the process, regulates the manipulated variable. In the lower box is represented the process which is affected by a load-changing (demand changing) variable, i. e., a variable that is uncontrolled. Variation in the load-changing variable would cause the value of the controlled variable of the process to change correspondingly were it not for the fact that the measuring element (represented by the left-hand box) in response to changes of the value of the controlled variable operates the controller (represented by the upper box). The controller operates to establish a correspondingly varying output force which regulates the manipulated variable (shown in the right-hand box) which in turn affects the process. In practice the manipulated variable may be made just to counteract a change of the load-changing variable so that, following the change variable, there is no permanent departure of the controlled variable from a control point value.

For example, in a pipe still such as is used in the petroleum refining industry, there is a long coil of pipe inside a furnace. Crude oil to be heated is caused to flow through the coil, entering at an inlet end and leaving at an outlet end. It is desirable to maintain the temperature of the oil leaving the outlet end of the coil at some constant temperature and this temperature represents the controlled variable of this process and the condition to which the measuring element is responsive. Heat is supplied to the furnace by oil burners. By regulating a valve in the line supplying oil to the burners more or less heat is supplied to the furnace to keep its temperature at the desired value regardless of changes in such load-changing variables as changing inlet oil temperature, etc. Consequently, the fuel flow to the burners is the manipulated variable of the process.

Processes of this type may be characterized as continuous processes because the material being treated flows continuously through the furnace.

Continuous industrial processes offer varying degrees of difficulty to control by automatic controllers. The degree of difficulty is generally indicated by how the primary or controlled variable being controlled responds to the changes of the manipulated variable. If, for example, when the manipulated variable is changed, the controlled variable immediately starts changing at a maximum rate in response to the change of the manipulated variable, then the process may be regarded as a simple process to control, i. e., one which offers relatively little difficulty. A reason that such a process is easy to control is that following any change in the manipulated variable, the change is always immediately effective to its maximum extent in causing the controlled variable to change. When, however, the process is of such nature that, following a change in the manipulated variable, it takes time for the controlled variable to assume its maximum rate of change in its response to the change of the manipulated variable, then the process may be regarded as more difficult to control.

Automatic controllers are made adjustable to match them to the degree of difficulty that the particular process to which the controller may be applied, offers to control operation. It is an object of the present invention to provide improved method and apparatus for adjusting automatic industrial controllers to the processes to which they are applied to obtain the desired control results.

In the drawings

Figure 4 is a view showing nine curves. The different behaviors of a controlled variable of nine different processes varying in degree of difficulty of control and in degree of slowness in reacting to control effects;

Figure 6 is a diagrammatic view of the controller of Figure 5 and illustrating an embodiment of the invention;

Figure 7 is a chart showing the behavior of the controlled and manipulated variables of a process when controlled by one type of controller which makes proportioning and derivative control effects;

Figure 8 is a chart showing the behavior of the controlled and manipulated variables of a process when controlled by a controller embodying the present invention.

Figure 2:
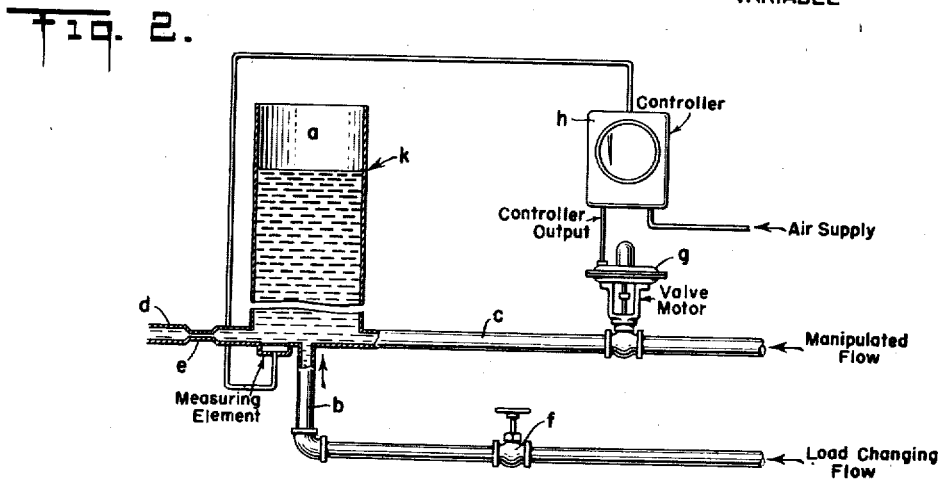
Figure 2 is a view diagrammatically representing a single capacity process (which represents a process that is simple to control) controlled by an automatic controller.

Referring to Figure 2, there is shown a single capacity process that may be considered as easy to control. It comprises a tank $a$ having two inlet pipes $b$ and $c$, and an outlet pipe $d$ provided with a restriction $e$. Water flows into the tank $a$ through both pipes $b$ and $c$. The flow through the pipe $b$ may be varied by means of a hand valve $f$, whereas the water flowing into the tank through the pipe $c$ is regulated by a conventional diaphragm motor operated valve $g$. The diaphragm motor is operated by pneumatic pressure supplied by a controller $h$ which, in response to the hydrostatic head in the tank $a$ converts an air supply to the controller into an output pneumatic control pressure.

In this simple process the flow of water out through the outlet pipe $d$ at any moment depends upon two factors: one, the liquid level (hydrostatic head) in the tank $a$ which is the controlled variable; and the other, the amount of the fixed restriction $e$ in the outlet pipe $d$. The greater the hydrostatic head in the tank $a$, the greater will be the outflow through the pipe $d$. Also, under equilibrium conditions the flow out through the pipe $d$ will equal the sum of the inflows through the pipes $b$ and $c$. In other words, a hydrostatic head will become established in the tank $a$ sufficient to make the outlet flow $d$ equal the sum of the inflows $b$ and $c$.

Figure 1:
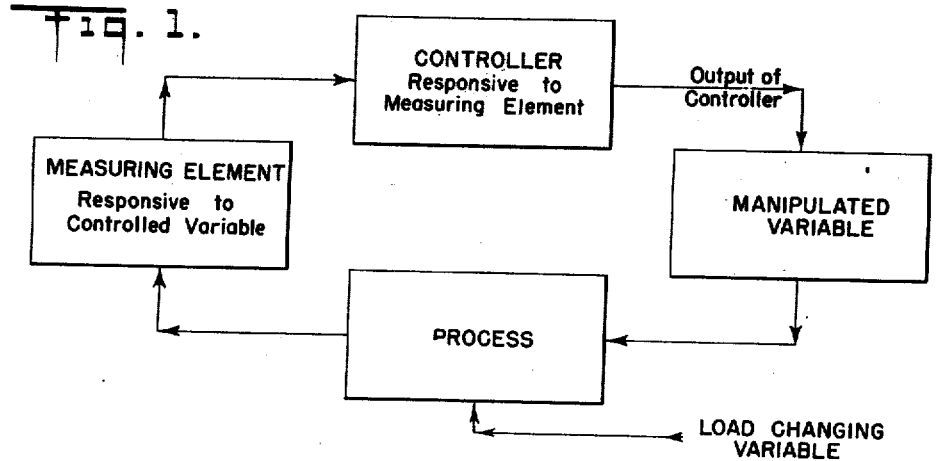
Figure 1 shows diagrammatically the relationship just discussed between a controller, the process to which it is applied, the manipulated variable, and the controlled variable.

In this process it is desired to control the liquid level in the tank $a$ at a level designated by the arrow $k$. Thus the level in the tank $a$ is the controlled variable of the diagram of Figure 1. The flow into the tank $a$ through the pipe $b$ is an uncontrolled flow, i. e., one that is arbitrarily changed and represents the means by which a change of load or demand is placed on the process. The flow through the pipe $c$ is the flow regulated by the controller; it is the manipulated variable, i. e., the variable that is changed in order to make the total flow into the tank $a$ that which is required to hold the level at the value $k$, regardless of the load on the process. In other words, variation in the flow into the tank through the pipe $b$ varies the demand on the process, and varies the value which the controller will have to make the manipulated flow to hold the level at the desired value.

Assuming for the moment manual operation of the valve $g$ operated by the diaphragm motor, it will be observed that if, following a condition of equilibrium in the tank $a$, the flow into the tank through the pipe $c$ were suddenly increased, then because the total flow into the tank is greater than the flow out, the level in the tank $a$ would start rising at a maximum rate and would finally balance out at a new and higher level corresponding to the increase in flow of the manipulated variable. Because the instant that the increase in flow through the pipe $c$ is made there exists the maximum difference between inflow into and outflow from the tank $a$ the level will start rising faster and then slow down as the hydrostatic head gets higher and increases the flow out through the pipe $d$. This means that if, for example, the level had been below the value $k$ and were rising, and had reached the point $k$, and the manipulated flow was then decreased to the correct amount to make the total inflow equal the outflow, the level would rise no further. It also means if, following a condition of equilibrium in which the flow out through the pipe $d$ equalled the combined inflows through the pipes $b$ and $c$, and the flows through the pipes $b$ and $c$ were respectively reduced and increased simultaneously the same amounts, the level in the tank would not change at all.

The fact that there is only one tank $a$ (which may be regarded as a single-capacity tank) and that there is only the single restriction $e$ which serves to hold back the water in the tank and so makes it possible for the tank to store up water, and the fact that the flow through pipe $c$ goes directly to tank $a$, make such a process relatively easy to control. The instant the controller (referring to Figure 2) changes the flow in the pipe $c$ by means of the diaphragm motor operated valve, the full effect of this change to give the level in the tank $a$ a rate of change takes place. If the controller, following a change in the load caused by changing the flow through the pipe $b$ makes a change in the flow through the pipe $c$ that is in excess of the final change required to meet the new load, and when the level reaches the value $k$ and the controller removes the excess, then the removal of the excess is immediately effective to prevent the level in the tank $a$ from rising above the value $k$.

In difficulty-controlled processes there may be a series of tanks (capacities) joined one to the other by restrictions, imposed between the final tank (having the controlled variable) and the manipulated variable, so that the effect of a change in the manipulated variable must travel successively through the capacities and connecting resistances in order to cause the controlled variable to change.

Figure 3:
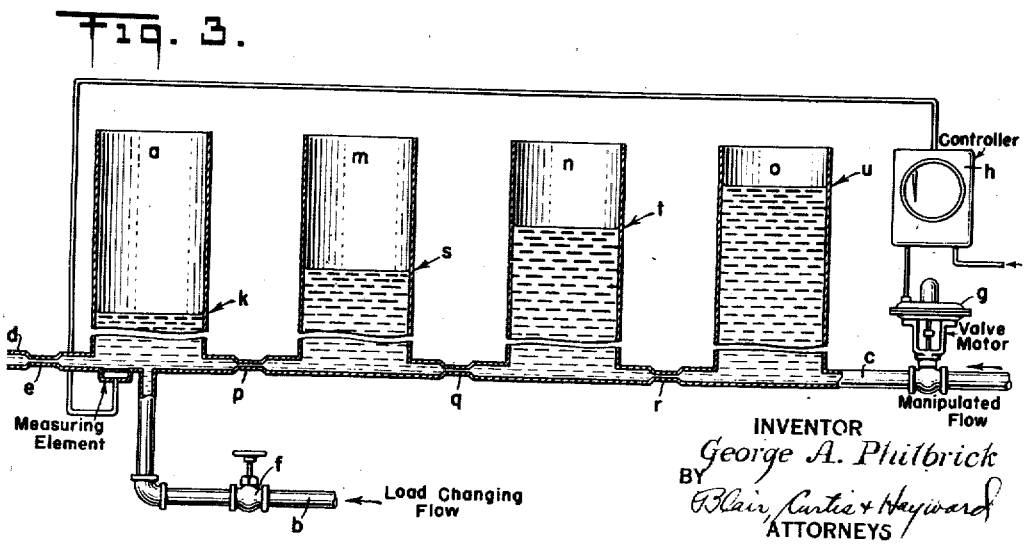
Figure 3 is a view diagrammatically representing a multiple capacity process controlled by a controller and which process may be considered as difficult to control.

Such a multiple capacity process is shown in Figure 3 which shows four tanks connected in series through three resistances. The tanks $m$, $n$, and $o$ are shown interposed between the pipe $c$ and the tank $a$. The tank $m$ is connected to the tank $a$ through a restriction $p$. The tank $n$ is connected to the tank $m$ through the restriction $q$, and the tank $o$ is connected to the tank $n$ through the restriction $r$.

If we consider that the problem of the process is as before, to control the level in the tank $a$ at the level $k$, and if we consider as before that the flow into the tank $a$ through the pipe $b$ is uncontrolled and is made whatever arbitrary amount that some influence makes it, then we see that in order for the manipulated flow through the pipe $c$ to effect a change of flow into the tank $a$ through the restriction $p$, the levels first must change in the three tanks $o$, $n$ and $m$. In other words, a sudden increase in the flow through the pipe $c$ is no longer instantly effective to the full extent to give the level in tank $a$ a rate of change.

Thus, following a condition of equilibrium in the tanks, if an instantaneous increase is made in the flow $c$ there is no increase in the flow into the tank $a$ and so no rise in the level in the tank $a$ until the level in the tank $m$ is raised—and there is no rise in the level in the tank $m$ until the level in the tank $n$ has been raised—and there is no rise in the level in tank $n$ until the level in the tank $o$ has been raised. Following a change in the flow in the pipe $c$, there is a retardation in the effect of the change in causing a rate of rise of the level in the tank $a$.

It is evident, also, that in this multiple capacity process if the flow in pipe b is decreased and simultaneously the flow in pipe c is increased an equal amount, the level in the tank a, instead of remaining constant as in the single capacity process, would start dropping because the outflow caused by level k in tank a will be greater than the combined inflow into tank a. Consequently, the level in tank a will drop until the resulting reduced outflow from tank a and the increased inflow from tank m are sufficient to make the outflow equal to the combined inflows. Only by increasing the levels in the tanks m, n and o to increase the inflow into tank a an amount equal to the decrease in the inflow from pipe b can the level in tank a be maintained at the value k. But to increase the levels in the tanks m, n and o it is necessary to supply more water to them than is flowing out. Under the present assumption this takes place as a result of the increase in the manipulated flow in pipe c but it will take some time to accomplish it and during this time the level in tank a will remain below its value k. Thus, after the level in tank a stops dropping, it then starts rising due to the rising level in tank m increasing the flow into tank a, and eventually rises with the level in the tank m. It will take some time for the level to rise to its previous value because this condition cannot come about until the levels in the tanks m, n and o are raised sufficiently in response to the increase in the flow through the pipe c to make the inflow into the tank a through the restriction p equal to the inflow in pipe c, which flow was increased an amount sufficient to offset the reduction of the inflow through the pipe b.

The control of such a process is made difficult because although the controller makes immediate changes in the manipulated flow, they are not fully felt in affecting the level in tank a until some time later. Consequently, considerable deviation of the level from the level k may be caused by changes in the flow through pipe b, even though the controller makes immediate changes in the flow through pipe c in response to change of the level in tank a.

In processes such as shown in Figure 3, improved control action has been obtained by making changes to the flow in the pipe c in excess of the exact corrections that would be required just to offset changes in the demand caused by changes in the inflow through the pipe b. Such changes are herein referred to as excess corrections, i. e., corrections in excess of the final correction to the flow necessary just to offset the change in demand and eventually to return the controlled variable to its control point value. But such excess corrections must be carefully manipulated (put on promptly and taken off at the proper time) for otherwise excessive levels may be caused to build up in the intermediate tanks m, n and o, and under such circumstances the only way for such excessive levels to dissipate themselves is by the water in the tank flowing out through the tanks and thereby causing the level in tank a to rise above its control point value. Consequently, if such excess corrections are not put on and taken off properly, they may cause undesirable fluctuations of the level in the tank a above and below the value k.

The difficulty that such multiple capacity processes offer to control is not only affected by the number of such connected capacities, but also by the relative sizes of the capacities and the relative effectiveness of the connecting restrictions. So it is not possible in practice to tell exactly how difficult a process will be to control by counting the number of capacities and restrictions. A measure of the amount of difficulty is, however, indicated by the nature of the retardation of the controlled variable of the process in changing in response to changes of the manipulated variable.

Another characteristic of an industrial process that has to be taken into consideration in automatic control is the slowness of the process, i. e., the time that it takes the controlled variable to come to a state of approximate balance following a change in either the manipulated flow or the demand change of flow. This time lag of the process has nothing to do with the above described difficulty it offers to automatic control, but it does place a limitation on how rapidly the controller may operate to cause the controlled variable to balance out at the control point following a deviation of the variable from its control point value. For example, if the tanks of Figure 3 are each made very small in cross-sectional area, then following a given change in the manipulated variable the controlled variable may come to within an approximately balanced condition quite rapidly. Such a process is a fast process and the controller is adjusted to bring it to balance rapidly. If, however, the cross-sectional areas of the tanks are made very large, then the process for the same change of the manipulated variable would come to within an approximately balanced condition only after a much longer period. Such is a slow process and a controller controlling it can only be adjusted to bring it to balance slowly.

A comparison of the behavior of easy and difficult processes and of slow and fast processes is shown in the nine curves of Figure 4, which curves diagrammatically represent, for example, the behavior of the level in the tank a following a sudden and sustained increase in the inflow through the pipe c while maintaining the flow through pipe b constant. In each of the curves the same increase in the flow in pipe c was assumed to be made. The curves A, B and C in the left-hand column show the behavior of the level in the tank a following such a change in flow in pipe c for the single capacity process of Figure 2. The curves in the second column show the behavior of the level in tank a of Figure 3 under similar circumstances. The curves in column 3 show the behavior of the level in tank a when the process of Figure 3 has been made more difficult, as by changing the relative sizes of the restrictions.

The upper curve (A) of column I shows the behavior of the level of an easily-controlled fast process, and the curve shows that, following the increase in the flow in the pipe c, the level had very nearly risen seven-eighths of the distance it had to rise to its new balance value at the end of one unit of time. The middle curve B in the first column shows the behavior of the level of an easily-controlled process like that of Figure 2 but in which the tank a has a larger cross-sectional area, and so a larger capacity to hold water per unit of level. This curve shows that it took approximately four units of time for the level to rise seven-eighths of the distance it had to go to reach its final value following the change in the flow in pipe c, and shows that this process is slower, i. e., takes longer time to come to approximate balance following the change in the manipulated variable. The lower curve C in the first column shows behavior of the level following such a change in the inflow in the pipe c for a still slower process. It is noted that in each of these curves, because the process is easy to control and is one in which there is no retardation in a change in the manipulated variable effecting a rate of change of a controlled variable following a change in the manipulated variable, the level in each case started rising at its maximum rate.

Turning now to the curves in the second column which show the behavior of the level in the tank a when the tank is part of the process that is moderately difficult to control, in the uppermost curve $A_1$ the level, following the same increase of flow through pipe c, instead of starting rising at a maximum rate, rose slowly at first, then faster and then more slowly again until it reached a point seven-eighths of the distance it had to rise in approximately three units of time after the disturbance. Although this process may be considered as fast as that which produced curve A, it took slightly longer for the level to come to within approximate balance because of the retardation effect.

The middle curve $B_1$ of the second column shows the behavior of the level in the tank a when the process has the same degree of difficulty but is moderately slow, as is the process that produced curve B. Thus the time for balancing out is somewhat longer than that shown by the adjacent curve B.

The bottom curve $C_1$ shows the behavior of the level in the tank a for a still slower process, and shows that a still longer time is required not only for the level to reach its maximum rate of rise but also for the level to rise seven-eighths of the distance it eventually travels to its final balance point.

Referring now to the curves $A_2$, $B_2$, and $C_2$ in the third column, the uppermost curve shows the behavior of the level in the tank a when part of a still more difficult process, but which process is fast in the sense that the process that made curve A was fast. Notice that in curve $A_2$ the maximum rate of rise occurred at a considerably later time than in curve $A_1$ and at a still later time as compared with the curve A. Curves $B_2$ and $C_2$ show how in this more difficult process the maximum rate of rise is delayed still more as compared with curves $B_1$ and $C_1$.

In the control of industrial processes not only must the automatic controller be constructed and adjusted to take into account the difficulty of the process, but also to take into account its slowness so that the controller in making corrections to the manipulated variable will make them in such manner as to obtain the desired control effect without causing undesirable cycling of the controlled variable. Such an adjustment will return the process to a condition of equilibrium at the control point following a change in the demand with a minimum of deviation of the controlled variable from its control point value.

Method and apparatus have been devised for regulating the manipulated variable simultaneously in response to three functions of a measuring element responsive to the controlled variable. Thus a controller is shown in the Mason application, Serial No. 385,493, filed March 27, 1941, which, in response to the measuring element makes three control effects, i. e.:

(1) Gives the manipulated variable a change proportionate to change of the controlled variable;

(2) Gives the manipulated variable a rate of change proportionate to the deviation of the controlled variable from a control point; and (3) Gives the manipulated variable a change proportionate to the rate of change of the controlled variable. But care must be exercised lest one of these control effects so operates on the manipulated variable as to cause an undesirable cycling of the controlled variable. The controller in response to variations of the controlled variable imposes these three control effects on the manipulated variable simultaneously, and in so doing makes and removes excess corrections which result (if the controller is properly adjusted to the process) in holding the controlled variable close to the control point value regardless of changing demand on the process. In general, the adjustment takes into consideration the fact that the slower the process is, the less must be the rate of change given to the manipulated variable in response to the deviation of the controlled variable from the control point, and the slower the process is, the greater may be the change given to the manipulated variable in response to the rate of change of the controlled variable.

It is an object of the present invention to provide improved method and apparatus for regulating the manipulated variable in response to the above-mentioned functions of the controlled variable in such manner that the control effects are readily adjustable to adapt the controller to the control of industrial processes having varying degrees of difficulty and varying magnitudes of slowness.

Figure 5:
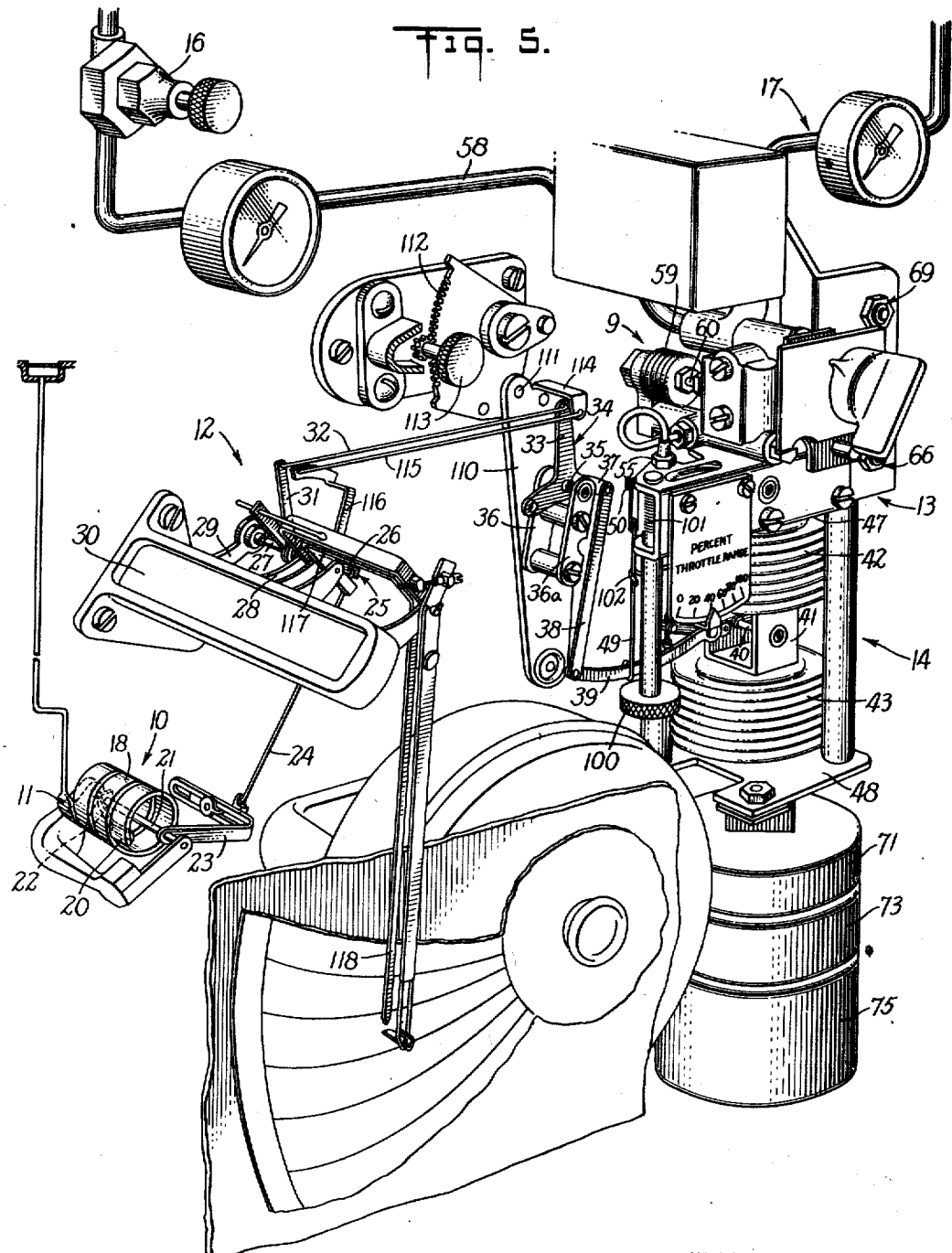
Figure 5 is a perspective view of control mechanism to which the present invention may be adapted.

Referring to Figure 5, there is shown in perspective automatic control mechanism disclosed in the above-mentioned Mason patent application. The controller may be considered as being responsive to the liquid level in the tank a of the process of Figure 3. The controller is supplied with air under pressure and, in response to the liquid level changes in tank a, maintains a variable output or control pneumatic pressure which operates the diaphragm motor g which, in turn, operates a valve which varies the water flow in the pipe c.

Referring to Figure 5, in the lower left corner thereof is a measuring element generally indicated at 10. The measuring element includes a hollow helix 18, the interior of which is filled with a fluid which is made responsive to the hydrostatic head in the tank a. The helix is fixed at one end 11 and has a free end 20 so that the helix is free to unwind as the hydrostatic head rises and causes the pressure in the helix to increase, and to wind as the hydrostatic head falls. The free end 20 is suitably connected by a linkage mechanism, generally indicated at 12, for transferring the motion of the helix to the control mechanism proper, generally indicated at 13. The control mechanism includes a bellows assembly 14, a relay valve 9, and a control couple in the form of a baffle and nozzle generally indicated at 15 (not shown in Figure 5 but shown in Figure 6). Operating air pressure is supplied to the control mechanism through a reducing valve generally indicated at 16. The output or control pressure of the controller leaves through a line generally indicated at 17.

Turning now to a more detailed description of the controller, the measuring element 10 may be of the form shown in the Bristol Patent No. 1,195,334, and includes the hollow helix 18. A shaft 21 is provided concentric with the helix, and the free end 19 of the helix is mechanically connected to the shaft by a resilient strip 22 (shown in dotted lines) so that, as the free end of the helix winds and unwinds, the shaft 21 is rotated in exact correspondence. This movement of the shaft 21 is, therefore, made proportional to changes in the hydrostatic head in tank $a$.

This movement of the shaft is transmitted to the control mechanism 13 through the linkage generally indicated at 12. This linkage includes an arm 23, extending from the shaft 21, a link 24, connecting the arm 23 with a crank generally indicated at 25, and including an arm 26 to which the link 24 is connected, and a shaft 27 to which the arm 26 is secured. (See also Figure 6.) The shaft 27 is suitably pivotally supported between supports 28 and 29, extending from a base 30. The shaft 27, as part of the crank 25, also carries an arm 31 connected by a link 32 to the upper arm 33 of a crank generally indicated at 34. The crank 34 is secured to and supported by a shaft 35 suitably mounted between supports 36 and 36a. An arm 37 extends to the right of the crank 34, and is connected by a link 38 with the free end of an arc lever 39.

The arc lever 39 is part of the control mechanism proper and the linkage mechanism just described is designed to transmit to the free end of the arc lever even the slightest motions resulting from changes in the hydrostatic head. To this end the various shafts are preferably mounted in jewel bearings, and the connections between the links and the arms are made so as to transmit their motion one to the other without any binding or objectionable friction.

Referring now to the bellows assembly 14, the arc lever 39 is fixed to a shaft 40, freely pivoted in a floating frame 41, supported between the free ends of upper and lower bellows 42 and 43. The bellows assembly (Figure 6) is shown as provided with opposing springs 44 and 45, and an inner bellows 46. The bellows and springs are fixed at their extreme upper and lower ends, respectively, to supporting plates 47 and 48. With this construction, as will be described, the frame 41, and so the pivoted end of the arc lever 39, is moved in a vertical plane by changing pressure differences in the opposing bellows. When equal pressures exist in the respective bellows, the opposing springs 44 and 45 cause the frame always to assume a neutral or norm position (indicated by the arrow).

The arc lever 39 is connected by a link 49 to a baffle operating lever 50, pivoted on a shaft 51, and having a baffle operating pin 52. Freely pivoted about the same shaft 51 is a baffle 53 urged by a light hair spring 54 against the baffle operating pin 52.

When the free end of the arc lever is in its neutral position at the axis line designated $y$—$y$ and when the bellows assembly is holding the pivoted end of the arc lever at its norm position, then the construction of the mechanism is such that the baffle 53 is held in its operating range with respect to the nozzle. For purposes, of convenience, so long as the baffle is in this operating range it is considered to be "tangent" to the nozzle. When the free end of the arc lever is raised or lowered away from its neutral axis by movement of the measuring element 10, the bellows motor assembly 14 acts to position the pivoted end of the arc lever in such manner as to keep the baffle 53 in said operating range "tangent" to the nozzle.

Thus, when the free end of the arc lever is moved by the measuring element from its neutral position, the bellows assembly acts to move the pivoted end of the arc lever exactly to compensate for the movement of the free end thereof by the measuring element to keep the baffle in its operating position. This action is carried out by the interaction of the control couple, the relay valve 9, and the bellows assembly 14. The output pressure of the relay valve, which causes the bellows assembly to operate to keep the baffle in its operating position, is also the output pressure of the controller and the pressure that goes to the diaphragm motor $g$. As will be described, the controller changes this output pressure in response to change of the hydrostatic pressure, and to the rate of change of the hydrostatic pressure, and imposes a rate of change on the output pressure in response to the deviation of the hydrostatic pressure from the control point value. Referring to Figure 6, the control couple comprises the baffle 53 and a nozzle 55, adapted to be supplied with air through a passage 56, a restriction 57 and a supply passage 58 connected with the pressure reducing valve 16 which supplies a substantially constant supply pressure to the restriction 57. The outlet of the nozzle emits a small jet of air, and as the baffle 53 moves to the nozzle the pressure back of the nozzle builds up in the passage 56, and as the baffle moves the slightest distance from the nozzle, the pressure in the passage 56 reduces to its minimum value. The movement of the baffle required to produce the required change of the pressure back of the nozzle to operate a relay valve is preferably less than 1/1000 of an inch, and so long as the baffle is within this 1/1000 of an inch of its travel from the nozzle it is considered to be in its operating range, i. e., "tangent" to the nozzle.

The relatively small variations in the pressure in the passage 56 which may be caused by movement of the baffle 53 within its operating position, serve to operate the relay valve 9. The relay valve includes a bellows 59, the interior of which is connected to the passageway 56. The lower end of the bellows 59 is fixed, but its upper end is free, and because the bellows has a spring characteristic, as the pressure in the bellows changes the bellows expands and contracts and its free end moves proportionately. The free end of the bellows carries a valve stem 60 on which is mounted a double-headed valve body 61 adapted to control the air flow to and from a chamber 62. The chamber 62 is connected through a passageway with the air supply from the passage 58 and reducing valve 16, and through another passageway with the atmosphere. When the bellows 59 expands, it moves the double-headed valve body 61 to close the passage connecting the chamber 62 with atmosphere, and opens the chamber to the supply pressure and establishes maximum output pressure. When the bellows 59 contracts the double-headed valve body closes the chamber from the air supply, and opens the passage connecting the chamber to atmosphere and establishes minimum output pressure. The spring characteristic of the bellows 59 is chosen to be such that only a variation of about three-quarters of a pound per square inch is necessary to move the valve body 61 between its limits of motion, and so produce maximum variation of the output pressure of the relay. Intermediate pressures in the bellows 50 produce pressures intermediate the maximum and minimum pressures.

The output pressure of the relay (which is the pressure in the chamber 62) is the output pressure of the controller. It is the pressure that operates the diaphragm motor g, and also is the motive pressure for the bellows assembly 14 which keeps the baffle 53 tangent to the nozzle 55 as the free end of the arc lever is moved by the measuring element. Before describing the complete operation of the bellows assembly in keeping the baffle tangent to the nozzle and in making changes in the output pressure at a rate proportionate to the deviation of the measuring element from a control-point position, and in making changes in the output pressure proportionate to the rate of change of the movement of the measuring element, it will be best to consider the details of the bellows assembly and of the effect of pressure differences between the bellows thereof and how such pressure differences may be established to move the pivoted end of the arc lever.

The effective area of the free end of the inner bellows 46 plus the effective area of the free end of the bellows 42, i. e., the area on which the pressure in the bellows operates to push on the free ends of the bellows, together equal the effective operating area of the bellows 43. Thus, when equal pressures exist in the three bellows, the combined force exerted by the pressure on bellows 46 and 42 equals the force exerted by the pressure on bellows 43, and the springs 44 and 45 position the frame 41 and the pivoted end of the arc lever at the neutral or norm position. This condition obtains regardless of the value of the equal pressures in the bellows. In the particular embodiment herein described the pressure may be any value—for example, between 0 and 16 lbs./sq. inch.

As above pointed out, the left or free end of the arc lever likewise has a neutral or norm position, and when both ends of the arc lever are in their norm position the baffle 53 is held in its operating position tangent to the nozzle. Since the free end of the arc lever is positioned by the measuring element, there is only one position of the measuring element 10 which will hold the free end of the arc lever at its norm position, and this position of the measuring element becomes its control point position, and so is the control point value of the liquid level in the tank a at which the controller will control the liquid level.

Unequal pressures between the lower bellows 43 and the upper bellows 42 and 46 result in the movement of the floating frame supported between the opposing bellows to positions corresponding to the value of the pressure differences. If, for example, the pressure in the bellows 46 and 42 is the same but is above the pressure in the bellows 43, then this means that the higher pressure in the bellows 46 and 42 will push down on the bellows 43 and move its free end until the springs 44 and 45 are flexed from their neutral position to an extent to create a force sufficient to counterbalance the unequal force created by the unequal pressures. The greater the pressure difference the greater the force required to counterbalance it and so the greater must be the flexure of the springs in order to counterbalance the unbalanced force of the pressures. Thus, the greater the pressure difference between the bellows the greater will be the movement of the floating frame and the pivoted end of the arc lever from its norm position. Of course, if the pressure in the bellow 43 is made higher than the pressure in bellows 42 and 46, the floating frame is moved upwardly in proportion to the pressure difference.

Referring to Figure 6, the output of the relay valve flows direct into small bellows 46 without passing through any restriction. This same output of the relay valve flows through a restriction 64 into the bellows 42, the function of which restriction will appear later. If the output of the relay valve increases, then this increase results in an increase in the pressure in the small bellows 46 and results in a flow of air through the restriction 64 and the passage 64a connecting bellows 46 and 42, so that the pressure in bellows 42 also increases. As a result, both bellows 46 and 42 act together to move the floating frame downwardly in response to an increase of the output pressure of the relay valve provided pressure in the lower bellows 43 is not increased equally by the same amount. Provision is made to prevent the pressure in bellows 43 from thus increasing simultaneously the same amount by providing a restricted passage between the bellows 42 and 43. Thus, although provision is made for flow of air between bellows 42 and 43 to change the pressure in bellows 43, pressure differences are readily established between the bellows to move the floating frame.

If the measuring element 10 moves to raise the free end of the arc lever from its norm position, this would result in tending to raise the baffle 53 to cover the nozzle, increase the pressure in back of it and cause the bellows 50 of the relay valve to expand. This action, however, operates immediately to increase the pressure in the chamber 62, and in bellows 46 and 42 to lower the floating frame and the pivoted end of the arc lever to the extent that the movement of the free end of the arc lever is compensated for and the baffle is held tangent to the nozzle. The reverse action takes place if the free end of the arc lever is lowered from its normal position by the measuring element. The reaction of the bellows, the control couple and the relay valve is such that if the bellows tended to lower the pivoted end of the arc lever too much so as to tend to cause the baffle to uncover the nozzle, the output pressure of the relay would reduce so as to cause the bellows to raise the pivoted end of the arc lever. So also if the bellows tended to raise the pivoted end of the arc lever too much, it would tend to cause the baffle to cover the nozzle, the output pressure of the relay would increase and cause the bellows to lower the pivoted end of the arc lever. These reactions between the bellows, the control couple and the relay valve are so fast that, for all intents and purposes, the bellows 46 and 42 hold the baffle tangent to the nozzle and in a substantially steady condition even when the free end of the arc lever is being moved by the measuring element.

In other words, the output pressure of the relay valve is conducted to the bellows 42 and 46 in such manner as to operate to move the floating frame 41 in response to movements of the free end of the arc lever to keep the baffle 53 tangent to the nozzle. This means that the output pressure of the relay valve changes whatever amount is necessary to compensate for the movement of the free end of the arc lever. For this reason, it is convenient to refer to the bellows 42 and 46 as the proportioning bellows.

To study the operation of the bellows 42 and 46 in producing changes in output pressure of the controller in response to movement of the free end of the arc lever, and to study the function of the restriction 64 between the bellows 46 and 42, we can for the moment assume bellows 43 to have 8 lbs. pressure locked in it and that we can manually move the free end of the arc lever up and down with respect to its norm position. As above described, the output pressure of the relay valve goes directly to the inner bellows 46 through the passage 63 and flows to the outer bellows 42 through the restriction 64 and a passage 64a.

Assuming that the free end of the arc lever is manually held at its norm position, then because 8 lbs. pressure is locked in bellows 43 and because equal pressure must exist in the bellows to hold the frame 41 in its norm position to position the baffle 53 tangent to the nozzle, the reaction of the baffle-nozzle relay valve and bellows 46 and 42 must establish an output pressure of 8 lbs. pressure therein, to hold the baffle 53 tangent to the nozzle. This, of course, means that 8 lbs. pressure now exists in each of the bellows 46, 42 and 43.

If, now, the free end of the arc lever is raised at a given rate, its motion tends to move the baffle closer to the nozzle with the result that the pressure back of the nozzle increases, causing the relay bellows 59 to expand to move the double-headed valve to increase the pressure in the chamber 62. The immediate action on the bellows 46 is to give it almost an instantaneous pressure increase immediately to start lowering frame 41 at a rate proportionate to the rate at which the free end of the arc lever is rising.

The increased pressure in the passage 62 and the bellows 46 above that which had existed in the bellows 42 produces the result that air flows through the restriction 64 and passage 64a into bellows 42 and gives the pressure therein a rate of increase. As the pressure in bellows 42 increases, it also acts to lower the frame 41 and, consequently, after the initial increase of the pressure in bellows 46, the pressure therein and the pressure in bellows 42 increase at whatever rate is necessary to lower the floating frame 41 to maintain the baffle tangent to the nozzle while the free end of the arc lever is rising. After the free end of the lever has been given a rate of rise the rate at which the pressures must increase in the two bellows 46 and 42 is proportionate to the rate at which the free end of the arc lever is rising, and the faster the free end rises, the greater must be the rate of increase of the pressure in the two bellows. And the greater the rate of increase of pressure in bellows 42, the greater must be the pressure difference established between bellows 46 and 42 to cause the airflow into bellows 42 to be enough to give it the necessary rate of pressure increase. Consequently, the greater the rate of rise given to the free end of the arc lever, the greater must be the pressure difference established between the bellows 46 and 42, i. e., the greater must be the pressure in bellows 46 above that in bellows 42.

The rate at which the pressures in bellows 46 and 42 increase for a given rate of change in the free end of the arc lever is made adjustable by changing the leverage between the link connecting the arc lever and the baffle operating arm.

Thus, as the connection between this link and the arc lever is moved to the left along the arc lever and towards the free end thereof, a given rate of rise of the free end of the arc lever requires a larger rate of lowering of the pivoted end of the arc lever, and so a larger rate of increase of the pressures in the bellows 46 and 42. Conversely, as the connection between the arc lever and the link is shifted to the right and toward the pivoted end of the arc lever the same rate of rise of the free end of the arc lever requires a lesser rate of lowering of the floating frame 41 and so a lesser rate of increase of the pressures in the bellows 46 and 42. This adjustment will be referred to as "the adjustment of the proportioning effect of the controller" or "the proportioning band" thereof, and as the connection between the arc lever and the link is shifted to the left along the arc lever and toward its free end, the proportioning band is decreased so that a given movement of the free end of the arc lever produces a greater change of output pressure.

The amount of pressure difference between the bellows 46 and the bellows 42 necessary to effect the required rate of change of the pressure in the bellows 42 to keep the baffle tangent to the nozzle, for a given rate of rise of the free end of the arc lever, depends upon the rate of pressure change in the bellows 42 that a given pressure difference between bellows 46 and 42 produces. This in turn depends upon two factors: (1) the amount of the restriction 64 between the two, and (2) the effective volume connected with the bellows 42. The greater the restriction the greater must be the pressure difference across it to obtain a given flow of air through it. The larger the volume, the greater must be the flow of air into it in order to produce the given pressure change. The product of a particular value of restriction expressed in suitable units and of the volume associated with the bellows 42 expressed in suitable units will be referred to as the "time constant" thereof.

In the present embodiment this time constant refers to the time that is required for the pressure in the volume associated with bellows 42 to change a unit amount when a unit pressure difference is imposed across the restriction 64. But the time constant may be defined more broadly and without reference to the physical characteristics of the system, i. e., whether it be a pneumatic system, a hydraulic system, an electrical system, or other type of system. Thus a system may be considered as having a time constant within the meaning of the present specification if a potential of the system changes at a rate in proportion to the difference between two potentials in the system. The time constant of the system equals the time required for the said potential of the system to change an amount equal to a unit difference between the two potentials. Thus in the system shown in Figure 5, the two potentials may be considered as the pressure in bellows 46 and the pressure in bellows 42, and the time constant will equal for example, the time that it takes for the pressure in the bellows 42 to increase 1 lb./sq. in. when a constant pressure drop of 1 lb./sq. in. is maintained between bellows 46 and bellows 42. The larger the time constant, the longer would be the time required for the pressure in the bellows 42 to increase the 1 lb./sq. in. So also the larger the time constant the greater would be the pressure difference between the two bellows to maintain a given rate of increase of pressure in the bellows 42.

If now, following the rate of rise imposed on the free end of the lever, the lever is stopped, and the free end is held at its raised position, an increasing pressure is no longer required in bellows 46 and 42 to keep the baffle tangent to the nozzle. But the higher pressure that had existed in bellows 46 over that in bellows 42 continues to cause air to flow into bellows 42 so that the pressure therein continues to increase. But this action tends to lower the frame 41 to take the baffle away from the nozzle. Consequently, the bellows and the nozzle-baffle control couple and the relay valve react to reduce the pressure in the bellows 46 simultaneously with the pressure increasing in bellows 42. The result of this action is to reduce the pressure in bellows 46 and so the output pressure of the controller when the arc lever stops moving.

Analyzing this action, it is apparent that, as a result of the free end of the arc lever having been raised, the output pressure of the controller has been increased a proportionate amount. This function of the controller, by which the output pressure of the controller is changed proportionately with movement of the free end of the arc lever, will be referred to as its "proportioning control effect." Also, so long as the free end of the lever has a rate of rise, it is apparent that because the restriction 64 prevents free flow of air to bellows 42, a step-up in the output pressure over and above that in bellows 42 is necessary to give the pressure in bellows 42 a rate of increase proportionate to the rate of rise, and that the amount of this step-up or quantitative increase in pressure over that produced by the proportioning effect alone is proportionate to the rate of rise of the free end of the arc lever. The greater the rate of rise of the free end of the arc lever, the greater quantitative pressure increase. The amount of the quantitative increase for a given rate of rise is dependent on the above-mentioned time constant. This control effect of the controller, by which the output pressure is given a quantitative increase or change proportionate to the rate at which the free end of the arc lever moves, will be referred to as the "derivative control effect" of the controller.

It is to be noted that changing the proportioning band by shifting the link 49 along the arc lever also changes the amount of the deviation control effect although the time constant of the mechanism producing the deviation control effect remains unchanged. This results from the fact that the deviation mechanism has in it a proportioning factor in addition to its time constant factor. Shifting the link 49 along the arc lever changes the proportioning factor. Thus, as the link is moved to the left along the arc lever a given rate of rise of the free end of the arc lever requires a faster rate of lowering of the floating frame, and to obtain this faster rate of lowering the output pressure has to be stepped up higher above the pressure in bellows 42; and so the quantitative increase of the output pressure above that produced by the proportioning effect alone is greater. Consequently, movement of the link to the left along the arc lever increases the amount of the deviation effect produced by a given rate of rise of the free end of the arc lever.

The small bellows 46 is useful in obtaining a smooth action of the controller, but is not essential, and the controller will work satisfactorily if the small bellows is eliminated and the restriction 64 put in the line 63 going directly to bellows 42. Thus connected, when the arc lever is given a rate of rise, the output pressure would increase immediately to that value necessary to give the pressure in bellows 42 the rate of increase necessary to maintain the baffle tangent to the nozzle and thereafter the output pressure would increase at a rate of proportionate to the rate of rise of the arc lever. But when the arc lever stops rising, then the output pressure would reduce to remove the excess pressure necessary to give the pressure in the bellows 42 a rate of rise.

To study these two-control effects of the operation of the bellows 46 and 42, and of the interconnecting restriction 64, it may be assumed that the controller is connected to control the liquid level in tank $a$ of the process of Figure 3. The measuring element 10 of the controller may be assumed to be responsive to the hydrostatic pressure in the tank $a$ and so to the liquid level in the tank $a$. The output pressure of the controller is conducted to the diaphragm motor $g$ which operates the valve regulating the manipulated flow through pipe $c$ into the tank $o$. It may also be assumed that the flow into the tank $a$ through the pipe $b$ is such that when an output pressure of 8 lbs. is supplied to the diaphragm motor $g$, it gives the correct flow in the pipe $c$ to maintain the level in the tank $a$ at the desired value $k$, and that the process is in equilibrium under these conditions. In other words, the flow through the pipe $c$ into the tank $o$ equals the flow out of the tank $o$, and the same applies to the tanks $n$ and $m$, and the combined flow into the tank $a$ through the pipe $b$ and through the restriction $p$ from the tank $m$ equals the flow out of the tank $a$ through the pipe $d$ produced by the hydrostatic head when the liquid level is at the value of $k$.

Following such a condition of equilibrium, it may be assumed that the flow through the pipe $b$ into the tank $a$ is suddenly decreased, to a reduced flow. This in effect increases the load or demand on the process in that it means that the diaphragm motor operated valve in the pipe $c$ will have to move to increase the flow through the pipe $c$ to increase the flow into the tank $a$ through the restriction $p$ if the level in the tank $a$ is to be maintained at its value $k$.

Following the sudden decrease in the flow through the pipe $b$ the level in the tank $a$ would start to drop fast at first, and then slower and slower as the falling head in the tank reduces the outflow through the pipe $d$. The pressure in the measuring element 10 decreases in like manner, with the result that its movement is transmitted to the free end of the arc lever, causing it to rise in like manner. The arc lever, given such a rate of rise, causes the immediate quantitative increase in the output pressure proportional to the rate of fall of the liquid level, and simultaneously continues to change the output pressure in proportion to the fall of the liquid level. Thus the immediate quantitative increase in the flow through pipe $c$, caused by the level in the tank $a$ having a rate of fall, is followed by a rate of flow increase proportionate to the rate at which the liquid level is falling.

Therefore, there are two control effects which tend to stop the liquid level from falling in the tank $a$: (1) the derivative control effect which makes the immediate increase in the manipulated flow when the level starts falling, and (2) the proportioning control effect which continues to change the flow in pipe $c$ as the level falls.

As the level falls more and more slowly and finally stops falling, the rate of pressure increase in bellows 46 and 42 required to keep the baffle tangent to the nozzle reduces and, therefore, the pressure difference between the bellows 46 and 42 reduces, with the result that two effects are now taking place on the output pressure: (1) the decreasing rate of fall of the level slows down the rate of the increasing output pressure and so reduces the pressure difference between bellows 46 and 42; and (2) the decreasing of the pressure difference between the bellows 46 and 42 serves to take off the initial pressure increase and so the initial correction to the flow in pipe c. But the almost instantaneous increase in the flow thus produced in the pipe c by the derivative control effect has served the purpose of increasing the flow in pipe c to cause the level in the tank o and the levels in the succeeding tanks to rise rapidly and so to increase the flow into the tank a through the restriction p. If adjusted properly this action of the controller will have raised the levels in the respective tanks nearly to the levels that they will finally have when the process is again balanced out. In other words, the derivative action, together with the proportioning action, makes a correction in excess of the final balanced correction that the controller will make, and as a result the level in the tank a is prevented from falling as far as it would have fallen had not this excess correction been made to the flow in the pipe c.

So, when the level stops falling and reaches its maximum point of deviation from its original value, the initial quantitative correction (due to the derivative control effect) made to the flow in the pipe c is entirely removed, but the correction made by the proportioning effect remains because the lowered liquid level causes the measuring element to hold the free end of the arc lever raised above its position corresponding to the level k and a pressure above the original 8 lbs. output pressure is required to keep the pivoted end of the arc lever lowered to hold the baffle tangent to the nozzle. This correction remains and, together with the higher levels established in the tanks by the derivative action, causes the flow into the tank a through the restriction p to be such as to cause the level in the tank a to rise. But, as the level in the tank a rises and thereby lowers the free end of the arc lever toward its norm position, the output pressure of the controller decreases to maintain the baffle tangent to the nozzle, and consequently the flow through the pipe c is decreased.

The controller, under these circumstances, cannot cause the level in the tank a to return to its original value k because at the value k the measuring element holds the free end of the arc lever at a position, which requires just 8 lbs. output pressure to maintain the baffle tangent to the nozzle. The 8 lbs. output pressure on the diaphragm motor does not produce sufficient flow through the pipe c to maintain the level in the tank a at the original level k under the condition of the increased load caused by the reduced flow into the tank a through the auxiliary pipe b. Consequently, the controller will cause the level to balance out at some value between its original value k and the level to which it would have fallen had no change been made in the flow through the pipe c.

Referring to the curves in Figure 7, the full line curve a shows an example of how the level in the tank a might behave under the conditions just described above, and the dotted line curve a' shows the behavior of the corresponding controlled flow in the pipe c as manipulated by the controller. Although these curves represent behavior in an actual process, they have been shown with arbitrary units of measurement to avoid the necessity of giving specific values to the process of Figure 3 and to the various adjustments in the controller. Curve a shows that prior to time zero the level in tank a was at the value k. At time zero the load-changing flow through pipe b was reduced and the level in tank a dropped rapidly and then stopped dropping and rose and balanced out at a new value k', which is below the original level of k.

Referring now to the controlled flow (the units for curve a' are at the right side of the chart) the curve shows that when the level was at k the controller maintained a flow of 160 units per minute, and that following the reduction in the flow through the pipe b at time zero, the controller almost instantly raised the flow up to 640 units/min. and thereafter, and even before the level reached its point of maximum deviation as shown by the curve a, the controller started reducing this excess correction to its final balanced value, and at the end of five minutes of time had caused the flow to balance out at its new and higher balanced value of approximately 300 units/min.

The proportioning control effect and the derivative control effect acted together to vary the manipulated flow as shown in curve a' of Figure 7. The proportioning control effect may be adjusted as already suggested by shifting the link 49 along the arc lever 39. As the link is shifted to the left along the arc lever and toward the free end thereof, the proportioning effect is increased, i. e., a given change of the liquid level in the tank a produces a correspondingly greater change in the output pressure. And vice versa as the link is shifted to the right along the arc lever and toward its pivoted end a similar change of the liquid level in the tank a produces a lesser change in the output pressure of the controller. But adjustment of the link along the arc lever to increase the proportioning effect of the controller also changes the proportioning factor of the derivative effect in the same direction as above described.

The mechanism for adjusting the proportioning effect is fully described in the above-mentioned Mason patent application and will be only briefly described herein.

Referring to Figure 5, connecting link 49 is shown pivoted from the baffle operating arm 52. The connection between the connecting link 49 and the arc lever is made by looping the lower end of the connecting link about the arc lever. When the arc lever is in its norm position the radius of its arc is at the connecting point between the link 49 and the baffle operating arm 52 when the latter is holding the baffle just tangent to the nozzle. The length of the link 49 equals the radius of the arc lever. Thus, the link 49 may be swung about its connection with the baffle operating arm 50, and its lower end moved along the arc lever without disturbing the arc lever when the arc lever is in its norm position. This is accomplished manually by means of a hand wheel 100, which rotates a worm 101, which in turn through suitable mechanism moves an arm 102 which freely engages the connecting link 49. As the gear segment is rotated it moves the arm 102 to the right or left and so swings the link 49 about its connection with the baffle operating arm

50 and moves the lower end of link 49 along the arc lever.

The time constant factor of the derivative effect may be adjusted independently of the proportioning effect. Thus, by reducing the time constant of the bellows 42 and its associated restriction 64, the amount of the excess correction shown in the curve *a'* of Figure 7 may be reduced. Conversely, by increasing the time constant as by either increasing the restrictive effect of the restriction 64 or by increasing the volume associated with the bellows 42, or both, the amount of the excess correction may be increased.

The adjustment which caused the level in the tank *a* to behave as shown in the curves of Figure 7 may be considered in many cases a desired adjustment because, although a large excess correction was made in the flow in the direction to prevent the level from falling, the excess correction was taken off and no correction in the reverse direction from the final balanced flow was necessary to prevent the level from over-running its final balance point. Also the level in balancing out did not overrun its final balance point. This type of adjustment gives the most stable kind of control. As the proportioning band is narrowed further, although it provides for more rapid return of the level to the balance point and produces less deviation from the original balance point, it may be made so narrow as to cause permanent cycling of the level across an average level value. If the derivative effect is too much, then the controller may also cause the process to cycle, i. e., cause the level in tank *a* to oscillate back and forth across its final balanced value.

In order to increase the flow through the pipe *c*, to the value necessary to cause the level in the tank *a* to balance out at its original value following the reduction in the flow through the pipe *b*, it is necessary to add the floating or reset effect, which is carried out by the reset bellows 43 and the restriction 65 connecting it with bellows 42.

Turning now to a discussion of the operation of the reset bellows, we had previously considered that 8 lbs. pressure was locked in the bellows 43, but this was only an assumption for, actually, the bellows 43 is connected through the restriction 65 and passage 70 with the interior of bellows 42. With such a connection, it would not be possible for a given pressure to remain in the bellows 43 so long as the pressure 42 was above or below the pressure in the bellows 43, because a pressure difference between the bellows would cause air to flow through the restriction 65 into or out of the bellows 43.

To study the operation of the three bellows 46, 42 and 43, in producing changes in the output pressure of the controller in response to movement of the arc lever, the controller will first be considered disconnected from the process and the free end of the arc lever will be assumed to be manually movable. It has already been pointed out that so long as the free end of the arc lever is at its neutral or control point position, equal pressures must exist in the three bellows to hold the baffle tangent to the nozzle and in balance. But the equal pressures may be any pressure within the operating range of the controller; for example, equal pressures of 3 lbs., 5 lbs., 16 lbs., etc., would all hold the baffle tangent to the nozzle under these circumstances. For the moment it will be assumed that the free end of the arc lever is at its normal or control point position, and that a pressure of 8 lbs. exists in each of the three bellows.

If, now, the free end of the arc lever is given a rate of rise upwardly, the pressure in bellows 46 will instantly increase to establish the necessary pressure difference between the pressure in bellows 46 and 42 to give the floating frame 41 of the bellows assembly a rate of lowering necessary to keep the baffle tangent to the nozzle and to compensate for the rate of rise of the free end of the arc lever. This increasing pressure in the bellows 42, however, creates a pressure difference between the pressure in the bellows 42 and the pressure in the bellows 43, with the result that air flows into the bellows 43 to give the pressure therein a rate of increase. The rate of increase is proportional to the pressure difference across the restriction 65 and to a time constant determined (as described in connection with bellows 42 and its restriction 64) by the amount of the restriction 65, and the volume associated with bellows 43. The increasing pressure in the bellows 43 tends to reduce the pressure difference between the bellows 42 and 43, but the bellows 42 and 46 act to increase the pressure therein to maintain the pressure difference necessary to lower the floating frame 41 to keep the baffle tangent to the nozzle. The result, therefore, of the increasing pressure in bellows 43 is to cause the output pressure of the controller to have a still further rate of increase. In other words, the increasing pressure in the bellows 43 acts to give the output pressure of the controller a rate of increase in addition to that caused by the movement of the arc lever.

If the free end of the arc lever is stopped and held in a position of deviation above its control point position, the pressure difference that exists between the bellows 46 and 42 acts first to tend to reduce the output pressure as the pressures between the two bellows 46 and 42 equalize. But so long as the arc lever is thus held deviated above its control point position, a higher pressure is required in the bellows 46 and 42 than in the bellows 43 in order to maintain the frame 41 in a sufficiently lowered position to keep the nozzle tangent to the baffle, and so long as the pressure in bellows 42 is above the pressure in bellows 43 air flows through the restriction 65 and passage 70 into bellows 43 to give the pressure in bellows 43 a rate of increase proportionate to the pressure difference and so proportionate to the deviation of the free end of the arc lever from its control point position. This rate of increase of the pressure in bellows 43 causes an identical rate of increase to take place in the output pressure of the controller because the bellows 46 and 42 operate to increase the output pressure to maintain the required pressure difference between bellows 46 and 42 to hold the baffle tangent to the nozzle. Consequently, so long as the free end of the arc lever is held deviated the pressure in the bellows 43 is given a rate of change which in turn causes the output pressure of the controller to tend to have the same rate of change. Also, the greater the deviation of the free end of the arc lever from its control point position, the greater will be the rate of pressure increase caused thereby.

When the free end of the arc lever is lowered to its control point position the pressure in bellows 46 and 42 reduces to remove the pressure difference and returns the frame 41 to its normal position. But because the pressure in the bellows 43 has been increased as a result of the air flowing into it during the deviation of the free end of the arc lever from its norm position, the output pressure of the controller now necessary to establish the zero pressure difference between the three bellows will be above the original 8 lb. value. For example, depending upon the extent to which the free end of the arc lever had been deviated, and the length of time it had been held deviated, the new pressure that is thus caused to exist in the bellows might be 10 lbs.

It is this action of the reset bellows 43, of tending to keep the pressure of the output pressure changing so long as the measuring element is holding the free end of the arc lever from its control point position, that keeps changing the flow in the pipe c until it reaches the correct value to balance the level in the tank a at the control point value k following the change in the flow through the pipe b.

The amount of the reset effect, i. e., the rate of pressure change in the output pressure for a given deviation, is made adjustable by adjusting the time constant for the reset bellows and associated resistances, i. e., by adjusting the value of the resistance 65 connecting the bellows 42 and 43 and adjusting the effective volume of the bellows 43. By increasing the amount of the resistance or by increasing the amount of the volume, the time constant may be increased and the larger the time constant the less the rate of change in the output pressure caused by the bellows 43 for a given pressure difference between the bellows 42 and 43.

Returning now to the condition in which the level in tank a as controlled by the controller without the bellows 43 connected, and in which the level was left balanced out below its original value of k and with the pressure in the bellows 46 and 42 above that of the pressure in the bellows 43, if the reset bellows 43 is connected as above described air will flow into the bellows 43 and give the pressure in it a rate of increase proportional to the deviation of the level from the value k. As a result the controller will cause the pressure on the diaphragm motor g to have a rate of increase and so the flow through the pipe c to have a rate of increase. As a further result, the flow into the tank a will increase, and as it does so the level in the tank a will rise, thereby reducing the amount of deviation, and the amount of the pressure difference between the bellows 42 and bellows 43, thereby slowing down the rate of increase in the output pressure that the deviation tends to cause. As the level returns to the control point there is a tendency also as a result of the proportioning effect to decrease pressure in the bellows 46 and 42 so that, as the level returns to the output pressure, two control effects operate on the output pressure, namely, that of the reset bellows tending to increase the output pressure and that of the proportioning bellows tending to decrease the output pressure. These two control effects act through the process to cause the level eventually to balance out at its original value, but with the final output pressure above that of 8 lbs. that had originally existed. As the level in the tank a returns to the control point the rate of change of the level becomes so slow that the derivative control effect is not effective to retard the movement of the level to its control point value.

Referring to Figure 8, curve b in solid lines shows the behavior of the level in the tank a, and curve b' in dotted lines shows the corresponding behavior of the controlled flow in the pipe c when the flow is controlled by the controller having the reset bellows connected as above described, i. e., having all three control effects. Referring to curve b, prior to time zero the level in the tank a was at the value k. At time zero, however, the flow into tank a through the pipe b was suddenly reduced and held at its reduced value. The curve b shows that the level immediately started to fall but stopped falling at the end of one and a half units of time, and at the end of five units of time was back in a balanced state at the control point k. The curve b' shows that, prior to the reduction of the flow through the pipe b, the flow through the pipe c was at 160 units/min., but that following the reduction in the flow through pipe b and within less than one-half a time unit after the upset, the controller had increased the flow in pipe c from 160 units/min. up to 720 units/min. This large excess correction which caused the level in the tanks m, n and o to build up and to stop the level in tank a from falling was taken off shortly after the level stopped falling and started rising, and the controlled flow balanced out at 320 units/min. at the end of seven units of time.

It was pointed out in connection with the description of the proportioning and derivative control effects that adjustment of the link 49 along the arc lever 39 to adjust the proportioning effect also proportionately and in the same direction affected the derivative effect, i. e., increasing the proportioning effect to produce larger change in the flow in the pipe c for a given change in the level in tank a, also produced a larger change in the flow in the pipe c for a given rate of change of the level in the tank a. So also shifting the link 49 along the arc lever 39 changes the amount of the reset control effect although the time constant of the mechanism producing the reset effect remains unchanged. The reset mechanism, as does the derivative mechanism, has in it a proportioning factor in addition to its time constant factor. Shifting the link 49 along the arc lever changes the proportioning factor. Thus, as the link is moved to the left along the arc lever a given deviation of the free end of the arc lever from its norm position requires a larger lowering of the floating frame to keep the baffle tangent to the nozzle, and to obtain this larger lowering of the floating frame a greater pressure difference is required between bellows 42 and bellows 43. This greater pressure difference between the two bellows causes a more rapid pressure increase in bellows 43 and, consequently, a more rapid increase in the output pressure for a given deviation. Consequently, movement of the link to the left along the arc lever increases the rate of change in the output pressure that a given deviation of the controlled variable from its control point will cause. It is evident, therefore, that changing the proportioning band of the controller besides proportionately adjusting the proportioning effect proportionately and in the same direction changes the amounts of the derivative and reset control effects.

The operation of the derivative and reset effects as affected by changing the proportioning band may be considered in a different light. Thus, the derivative mechanism may be considered as primarily responsive to the output pressure in the line 63. And the reset mechanism and its bellows 43 and associated resistance may be considered as responsive also to the output pressure in the line 63. Thus, for a given time constant of the derivative mechanism, and a given time constant for the reset mechanism, a given rate of change of the output pressure will always produce the same derivative effect, and a given pressure difference between the output pressure and the pressure in the bellows 43 will always produce the same rate of reset effect. Consequently, if the measuring element is omitted from consideration, so long as the responsiveness of the derivative mechanism to the output pressure and the responsiveness of the reset mechanism to the output pressure is maintained unchanged, the operation of the derivative and reset control mechanisms may be considered as independent of the proportioning action.

The foregoing discussion of the operation of the controller has not taken into consideration the characteristics of the process and the fact that the derivative and reset control actions, unless properly matched to the process, instead of giving good control results such as shown in Figure 8, may cause the liquid level to cycle, i. e., cause the liquid level to rise above and fall below the control point value $k$ without balancing out at the control point within a reasonable time. If either the proportioning control effect or the derivative control effect or the reset control effect is made too great in amount, such may cause undesirable cycling of the level. So also, if they are made too small in amount the controller will under-control, i. e., so regulate the manipulated variable as to permit the process to deviate too far from the control point and take an unnecessary length of time to balance out at the control point value following a change in the demand.

With regard to the reset control effect, the slower the process in the sense above discussed, the slower the reset control effect must be, i. e., the slower must be the rate of change of the pressure in the bellows 43 for a given pressure difference between the bellows 43 and the bellows 42. There is a critical value of reset for the slowness of each process which, if exceeded, causes cycling due to the fact that the pressure in the bellows 43 (following a change in the flow in the pipe $b$), increases or decreases beyond its final desired balanced value, and which excess pressure can only be reduced or increased by the level in the tank $a$ crossing and going above or below the control point value $k$. In the practical application of the controller to industrial processes, it is not essential that the reset rate be as fast as possible, i. e., be close to its critical value. It is only necessary that it be sufficiently slow to avoid objectionable cycling, but be fast enough to cause the process to balance out sufficiently rapidly at the control point following an upset. Thus, in general, the slower the process the slower must be the reset effect, and such is obtained by increasing the time constant factor of the reset mechanism.

So also the derivative effect may be considered to have a critical value of adjustment for each process, and which value together with the optimum proportioning effect adjustment will return the process, following a disturbance, to a condition of equilibrium in a minimum time with a minimum of deviation and without undesired cycling. If the derivative effect is not adjusted to have its critical or less than critical value, it may act to cause objectionable cycling of the controlled variable. The slower the process the greater may be corrections made by the derivative effect without causing cycling action. The faster the process the less must be the corrections made by the derivative effect to avoid cycling action.

In general, the faster the process the smaller must be the time constant factor of the derivative control mechanism to avoid cycling, for as has already been pointed out, the smaller the derivative time constant factor, the less will be the derivative control effect for a greater rate of change of the measuring element. So also, the slower the process the larger may be the time constant factor of the derivative control mechanism.

It is the proportioning effect of the controller that is adjusted to match the operation of the controller to the degree of difficulty of the process, and in general the greater the difficulty of the process as above described, the less must be the proportioning effect, i. e., the less must be the corrections made by the proportioning effect.

Such a controller as above described may be characterized as one in which there are three control effects, namely, the proportioning control effect, the derivative control effect, and the reset control effect; and adjustment of the proportioning band by moving the link 49 along the arc lever influences proportionately and in the same direction the three control effects. This means that were this the only mechanism provided for adjusting the amounts of the derivative and reset control effects, the adjustment of the derivative and reset control effects would be tied to the adjustment of the proportioning control effect. But, as pointed out above, this single adjustment would not be satisfactory because the slower the process the greater may be the derivative control effect, but the less must be the reset control effect. Therefore, mechanism is provided to adjust the derivative and reset control effects by adjusting the time constant factors. If the time constants of the derivative control effect and the reset control effect of a controller are properly related to the slowness of the process, then adjustment of the proportioning effect of the controller to the difficulty of the process to obtain the best control and the resulting adjustment of the proportioning factors of the derivative and reset control effects does not affect the desired amounts of the derivative and reset control effects.

In a controller of this type I have discovered that a satisfactory relationship exists between the adjustment of the derivative control effect and the reset control effect for most industrial processes to which the controller may be applied. Thus, I have discovered that if for each reset rate adjustment a predetermined derivative adjustment is made, desired control results may be obtained in so far as the reset and derivative control effects are concerned. By utilizing this discovery it is necessary only to adjust the reset rate to the value to match the slowness of the process and simultaneously adjust the derivative effect to a predetermined relationship with respect to the reset adjustment. Or the derivative effect may be adjusted and the reset adjusted to a predetermined relationship to the derivative effect. This feature is of real importance in the application of automatic controllers of this type to control an industrial process because unless the operator adjusting the controller to the process is highly skilled and has had considerable experience in the adjustment of controllers to match particular processes, he is unable to determine from the control results which he is obtaining the direction in which he should adjust the separate reset and derivative control effects to improve the control results. This is particularly true for slow processes which may be closely interconnected with other processes and in which the balancing out times of the process following disturbances may take anywhere from ten minutes to an hour or so.

In the present embodiment mechanism is provided for adjusting the time constant of the reset effect and thereby simultaneously adjusting the time constant of the derivative effect to give a predetermined and correct amount of derivative effect for each reset rate. With this mechanism the operator in adjusting the controller to the industrial process to which it is applied has only to make one mechanical adjustment which automatically takes care of both the reset and the derivative control effects. Thus the operator in adjusting the reset rate to the particular process to which the controller is applied does not have to endeavor by trial and error to discover the best derivative control effect adjustment independently of the best reset control effect adjustment.

As will be seen, such a controller is provided with two adjustments: one, the so-called "proportioning band adjustment" which adjusts the proportioning control effect and which changes equally and in the same direction the derivative and reset control effects; and a second adjustment which simultaneously changes the derivative control effect directly and which changes the reset control effect inversely.

The above-mentioned relationship between the reset and derivative control effects is evidently an empirical one, and is one which was discovered by observing the different adjustments of the reset and derivative time constants necessary to give optimum control results for a large number of different processes. By optimum control results is meant that in each case the process was upset the same amount and the proportioning, reset, and derivative control effects were adjusted to cause the process to behave in such manner that the deviation of the controlled variable from the control point was held to a minimum, and the controlled variable was caused to return to the control point in a minimum of time without undesired cycling.

By observing the values of the time constant adjustments of the derivative effect to obtain the optimum control results on a large number of different kinds of processes all requiring the same reset time constant to obtain optimum control results, I discovered that these values of the time constants of the derivative control effect all fell within a small range.

I discovered also that if an entirely new set of different processes were selected, all requiring the same reset time constant (but of a different value from that just mentioned) to obtain optimum control results, a different narrow range of values of the derivative time constant was obtained, to give optimum control results; and so on.

From these experiments I discovered that the above-mentioned relationship exists between the adjustment of the reset control effect and the adjustment of the derivative control effect to give close to optimum control results for all types of processes, and that so long as the derivative and reset control effects are maintained within this relationship, then when the reset effect is suitably matched to the slowness of the process the controller will give control results that approximate the optimum control results.

I discovered that if for each adjustment of the reset time constant factor the time constant for the derivative effect was selected from the above-mentioned range corresponding to the reset time constant, and was selected from that side of the range which gives the least derivative control effect, then good control results could be obtained when the controller was applied to all types of processes requiring the particular reset time constant adjustment, and which good control results were close to the optimum obtainable.

The derivative time constant in this relationship, based on the above-mentioned observations, apparently was always less than the reset time constant. Thus, the desired ratios of the derivative time constant to that of the reset time constant, based on the above-mentioned work, were found to be less than one (1) to give the best overall control results.

I have further discovered that since it is possible to obtain good control results without having the reset and derivative control adjustments set close to their critical values, a satifactory controller may be built adapted to control all types of temperature and other processes difficult to control, by making the reset and derivative control time constants adjustable in steps provided that in each step the above-mentioned relationship is maintained between the derivative and reset control effects. The values of the time constants of the reset adjustments of the steps are selected to cover the range of slowness of industrial processes which the controller may meet. Under such circumstances the derivative time constant made for each step is made small enough so that the derivative effect will not over-control those processes having a degree of slowness lying between any given reset adjustment and the next fastest reset adjustment.

In adapting the above discovery to a practical commercial instrument such as shown in the drawings, I discovered further that if for example four steps of adjustment are provided, when it is advantageous that the ratios of the time constants of the derivative to the reset control effects should be made progressively less from the step which provides the fastest reset adjustment to the step which provides the slowest reset adjustment, and that under such circumstances the slowest reset adjustment may adapt the controller to the slowest of processes which may be expected to be encountered without any tendency for either the reset or the derivative control effects to cause undesirable cycling.

Referring to Figure 6, the construction by which the reset and derivative effects are thus adjusted simultaneously by a single adjustment is shown as including a series of four by-pass valves 66, 67, 68 and 69, all of which are of the same construction. In describing the valves, reference will be made to valve 66.

The valve 66 comprises a casing 77 having a chamber 79, and a ported base 78. The chamber 79 is connected respectively to lines 66a and 67a and at all times provides for free communication between lines 66a and 67a. The base 78 has a port connected to line 66b. The chamber 79 may be sealed from the outlet 66b by a valve plunger 80. The valve plunger is carried by the free end of a sealing bellows 81 secured at its other end to the casing 77, and pneumatically sealed with respect thereto. The plunger 80 is operated to its seated and unseated positions by a threaded rod 82 adapted to be rotated to advance and retract the plunger to close off the communication between the chamber 79 and the outlet 66b. The presence of the sealing bellows 81 serves to prevent the possibility of leakage to atmosphere when the line 66a is connected with the line 66b or disconnected from it.

The interior of bellows 42 is connected by passage 66a with the chamber 79. The outlet in the base 78 is connected by the line 66b with the restriction 65 which in turn is connected by a passage 70 to the interior of bellows 43. Thus, by retracting the plunger 80 from its seat, the interior of the bellows 42 is connected with the bellows 43 through the passage 66a, the passage 66b, the restriction 65, and the passage 70.

By lines 67a, 68a and 69a the chambers 79 of each of the valves are respectively connected with each other and have free communication with each other so that in effect the interior of bellows 42 has free communication with each of the chambers 79 of the respective valves 66, 67, 68 and 69.

The outlet of valve 67 is connected to a capacity tank 71 through a passage 71a, and through a resistance 72 to the resistance 65 leading to the bellows 43. The outlet of valve 68 is connected to a tank 73 through the passage 73a, and through a resistance 74 to the resistance 72 and the capacity tank 71. The outlet of valve 69 is connected to a capacity tank 75 through a passage 75a, and through a restriction 76 to the capacity tank 73 and the restriction 74, the capacity tank 71, and the restriction 72 leading to the restriction 65.

When the valve 66 is open, and the valves 67, 68 and 69 are closed, the output pressure of the relay passes through the restriction 64, into the proportioning bellows. The value of the restriction 64 and the volume of the bellows 42 determine the adjustment of the derivative effect. The value of the resistance 65 and the volume of the bellows 43 determine the adjustment of the reset effect. This particular adjustment gives the fastest reset control effect, but gives the minimum of derivative control effect.

The value of the time constant of the restriction 64 and the volume of the bellows 42 associated with it are selected to have a predetermined relationship with respect to the value of the restriction 65 and the volume of the bellows 43 associated with it. In other words, the time constant which determines the amount of the derivative control effect has a predetermined relationship with respect to the time constant that determines the value of the reset control effect. When these time constants are expressed in time units, as for example minutes, I have discovered that their relationship should be such that the ratio of the derivative time constant to that of the reset time constant should fall within the range less than unity.

In the present embodiment the restriction 64, for example, may be considered as being a resistor and the volume associated with bellows 42 may be considered as being a capacitor, as above discussed in connection with the definition of a time constant. The respective values of these two elements may generally be expressed in terms of a restriction and in terms of a quantity. Thus, the value of the capacitor may be expressed in terms of the change that would take place in the potential in the capacitor as a result of the introduction of a unit quantity and the value of the resistance may be expressed in terms of the quantity the resistance would pass when a unit potential is applied across the resistance. In the present embodiment, a unit of quantity will be considered as a cubic inch of air at standard pressure and temperature. The number of cubic inches of air at such standard conditions is a measure of the quantity of air. The potential in the present embodiment may be considered to be lbs./sq. in. It follows, therefore, that the capacity of a volume is the number of cubic inches of air at standard pressure and temperature which must be added to increase the pressure of the volume 1 lb./sq. in. The value of the resistance is the number of lbs./ sq. in. pressure drop across the resistance necessary to produce a flow of 1 cubic inch of air per minute (converted to standard conditions). In other words, a unit of capacity is the amount of volume in which the addition of 1 cu. in. of air under standard conditions will raise the pressure therein 1 lb./sq. in.

In the present embodiment the restriction 64 has a value of 3 (lbs./sq. in.) per (cu. in./min.) and the volume associated with bellows 42 has a value of 0.147 cu. in. per (lb/sq. in.). The product (the time constant) of the value of the resistance times the value of the volume equals 0.441 minutes. The resistance of the restriction 65 is 5 (lb./sq. in.) per (cu. in./min.), and the volume associated with bellows 43 is 0.1635 cu. in. per (lbs./sq. in.). The product (the time constant) of the resistance and volume is 0.816 minute. The ratio of the time constants is, therefore, 0.54.

By closing the valve 66 and opening the valve 67, with the valves 68 and 69 closed, the bellows 42 is connected through the chamber 79 of valve 66, through the valve 67 and through the passage 71a with the chamber 71 so that the effective volume of the bellows 42 is now increased by the volume of the chamber 71. The value of the capacity of the combined volume of the chamber 71 and that of bellows 42 is approximately 0.294 cu. in./(lb./sq. in.). The time constant of the derivative effect is therefore 3 lbs./sq. in. per (cu. in./min.) times 0.294 cu. in./(lbs./ sq. in.) which equals 0.88 min. Thus, for this adjustment the derivative effect has been appreciably increased.

Opening the valve 67 and closing the valve 66, however, connects bellows 42 and bellows 43 through an additional restriction 72. This restriction has a value of 7 lbs./sq. in. per (cu. in./min.) which together with the value of restriction 65 makes a total restriction of 10 lbs./sq. in. per (cu. in./min.). This value of resistance multiplied by the value of the capacity of the volume of bellows 43 gives a time constant of 1.635 minutes. Consequently, the reset control effect for this adjustment is materially reduced (that is, less effective) over that when valve 66 was open. The ratio of the two time constants is approximately 0.54.

When the valves 66 and 67, and 69 are closed and the valve 68 is open, the time constant of the derivative effect is increased by the addition of the volume of the larger chamber 73 to that of the volume of the bellows 42. The value of the capacity of the combined volumes 73 and 42 has a value of 0.585 cu. in. per (lb./sq. in.). This multiplied by the value of restriction 64 equals 1.755 lbs./sq. in. per (cu. in./min.). The time constant is therefore 0.585 cu. in. per (lb./sq. in.) × 1.755 lbs./sq. in. per (cu. in./min.) equals 1.027 minutes. This amounts to a material increase of the derivative effect over that provided by the adjustment of the valve 67.

With the valve 68 open, the connection between the bellows 42 and the bellows 43 is provided by the restriction 74, the chamber 71, the restriction 72, and the restriction 65. The value of the resistance 74 is chosen to be 12 lbs./sq. in. per (cu. in./min.). The time constant of this adjustment of the reset effect is obtained by adding to the product of the value of the resistance 75 and the value of the volume of the chamber 71, the product of the value of the volume of bellows 42 and the sum of the values of the restrictions 72 and 65. This product gives a time constant of 3.52 minutes. The ratio of the derivative time constant to the reset time constant for this adjustment is therefore 0.29.

When the valves 66, 67 and 68 are closed and the valve 69 is open, the effective volume of the bellows 42 is increased by the addition of the large chamber 75 which has a value of 1.04 cu. in./(lb./sq. in.). The time constant of the derivative effect for this adjustment is the product of the value of the combined values 75 and 42 and the value of restriction 64 and equals 3.56 minutes.

With this adjustment the bellows 42 is connected with the bellows 43 through a new resistance 76 and the chamber 73, through the restriction 74, and the chamber 71, and through the restrictions 72 and 65 so that the reset effect has been again materially reduced. The value of the restriction 76 is 20 lbs./sq. in./(cu. in./min.). The time constant of the reset effect for this adjustment is 12.32 minutes, and the ratio of the time constants is 0.29. Although the ratios have not been reduced progressively in this example as for optimum results, the present example gives satisfactory operation.

It is to be noted that when the by-pass valve 66 is opened, the pressure in the bellows 42 in addition to being connected to the bellows 43 through the resistance 65 is also connected through the resistance 72 with the tank 71, through the resistance 74 with the tank 73, and through the resistance 76 with the tank 75. Theoretically, flow of air through these connections would have some effect on the output pressure of the controller, but practically, because the relative values of the resistances are high in comparison with the value of the resistance 64, the effect of such flows through these connections is so small that it may be disregarded. Also such small effect as these flows may have is advantageous rather than disadvantageous to the control action.

Provision of the above mechanism to change the capacitor values and resistor values has several advantages, among which is that of making it possible to obtain relatively large changes of the time constants of the derivative and reset control effects by the use of relatively small lengths of resistances and relatively small volumes associated with the resistances. Thus, this arrangement makes it possible to utilize mechanism which can be fitted into a relatively small space in a small instrument casing.

Of course, additional adjustments of the reset and derivative effect (maintaining the ratio anywhere from approximately 0.4 to 1.0) can be obtained by additional capacities and resistances and by-pass valves, but experience has shown that the four adjustments afforded with the values above given are sufficient to adjust the controller to obtain satisfactory control results on industrial processes of the type to which the controller was applied.

Before discussing the manner in which an operator might proceed to adjust the above controller to a particular process, mechanism will be described for changing the control point value at which the controller will maintain the value of the condition being controlled. This mechanism is fully shown in the above-mentioned Mason application and so will be described here only briefly.

Referring to Figure 5, the mechanism consists essentially of means for changing the relative position between the free end of the arc lever 39 at its norm position, and the position of the arm 23 of the measuring element 10 that holds the arc lever at its norm position. To this end the crank 33 is suitably supported on a plate 110 suitably supported and pivoted about the axis $y$—$y$. The upper end of the plate 110 is provided with a pin 111 which moves in a slot (not shown) in a gear segment 112 which may be manually rotated by means of a knob 113. Rotation of the gear segment swings the supporting plate 110 about its axis $y$—$y$, and thereby swings the shaft 35 supporting the crank 33 about the axis $y$—$y$. If the segment is rotated clockwise as shown in Figure 5, the plate 110 is swung counterclockwise, and in order for the element 10 to maintain the free end of the arc lever 39 at its norm position the element must wind. Thus, if we are considering the controller as applied to the process of Figure 3, this adjustment lowers the value of the liquid level at which the controller will control the process.

A pointer system is provided to point to the value to which the controller is set to control, and comprises an arm 114 extending from the plate 110, which arm is connected by a link 115 to an arm 116 adapted to operate a U-shaft 117 to which is secured an index pointer 118. Thus, as the plate 110 is swung about its axis $y$—$y$ to change the control point, the pointer 118 is shifted with respect to the chart to point to the new point to which the controller will control the process.

Returning to the application of the controller to a process such as shown in Figure 3, and the procedure for adjusting the controller to the slowness and difficulty of the process; the most advantageous adjustment of the reset and derivative effects may be conveniently determined by first adjusting the proportioning band. To this end all four of the by-pass valves are closed so that the reset control effect is cut out and only the resistance 64 connects the bellows 42 to the output pressure. The proportioning band is then adjusted by movement of the link 49 along the arc lever until the best operation of the controller is obtained. This is accomplished by first getting the level in tank $a$ balanced and then upsetting it by changing the control point of the controller by shifting the hand knob. Then it is observed whether or not the level in the tank $a$ balances out as rapidly as possible. If the level in balancing out does not cycle and takes a relatively long time, then the proportioning band is narrowed. If the level in balancing out cycles and takes a long time to come to balance, then the proportioning band is widened.

After the best adjustment of the proportioning band is obtained one of the by-pass valves is opened, for example valve 68. The process is then again upset by changing the control point, and if the controller causes the level to come to balance at the control point without appreciable cycling, the by-pass valve 68 is closed and the by-pass valve 67 is opened. If better control results are observed with this adjustment than with the by-pass valve 68 open, the by-pass valve 68 is opened and the process repeated. The by-pass valve to be left open is the one that produces the best control results. After the best by-pass valve adjustment has been selected, the proportioning band is again adjusted to narrow it still further until the best control results are obtained following the upset caused by changing the control point.

As various embodiments may be made of the above invention and as changes might be made in the embodiment above set forth, it is to be understood that all matter hereinbefore set forth or shown in the accompanying drawings is to be interpreted as illustrative and not in a limiting sense.

I claim:

1. In control apparatus for controlling a variable of a process by regulating a manipulated variable affecting the controlled variable, said control apparatus having mechanism for regulating the manipulated variable in response simultaneously to three control effects (1) a control effect that tends to change the manipulated variable an amount proportionate to the change of the value of the controlled variable, (2) a control effect that tends to give the manipulated variable a rate of change proportionate to the deviation of the value of the controlled variable from a control point value, and (3) a control effect that tends to change the manipulated variable an amount proportionate to the rate of change of the value of the controlled variable; in combination, first adjusting means for effectively adjusting simultaneously, directly, and proportionately the three control effects, and second adjusting means for simultaneously adjusting the action of the second control effect directly and for adjusting the action of the third control effect inversely.

2. In control apparatus for controlling a variable of a process by regulating a manipulated variable affecting the controlled variable, said control apparatus having mechanism for regulating the manipulated variable in response simultaneously to three control effects (1) a control effect that tends to change the manipulated variable an amount proportionate to the change of the value of the controlled variable, (2) a control effect that tends to give the manipulated variable a rate of change proportionate to the deviation of the value of the controlled variable from a control point value, and (3) a control effect that tends to change the manipulated variable an amount proportionate to the rate of change of the value of the controlled variable; in combination, first adjusting means for effectively adjusting simultaneously, directly, and proportionately the three control effects, and second adjusting means for simultaneously adjusting the action of the second control effect directly and for adjusting the action of the third control effect inversely, and said second adjusting means being so constructed and arranged as to establish predetermined and desired relationships between the amounts of the second and third control effects.

3. In control apparatus for controlling a variable of a process by regulating a manipulated variable affecting the controlled variable, said control apparatus including first mechanism producing a control effect which tends to change the manipulated variable an amount proportionate to the change of the value of the controlled variable, second mechanism having a time constant and producing a control effect that tends to give the manipulated variable a rate of change proportionate to the deviation of the value of the controlled variable from a control point of value, and third mechanism having a time constant and producing a control effect that tends to change the manipulated variable an amount proportionate to the rate of change of the value of the controlled variable, said three mechanisms acting simultaneously on said manipulated variable; in combination, first adjusting means for effectively adjusting simultaneously, directly, and proportionately the effects of all three mechanisms on said manipulated variable produced in response to said controlled variable, and second adjusting means for simultaneously adjusting the time constants of said second and third mechanisms to maintain a predetermined relationship therebetween.

4. In control apparatus for controlling a variable of a process by establishing in response to variations of the value of said variable a control force, said control apparatus including first mechanism producing a control effect which tends to change said control force an amount proportionate to the change of the value of said variable, second mechanism having a time constant and producing a control effect that tends to give said control force a rate of change proportionate to the deviation of the value of the variable from a control point value, and third mechanism having a time constant and producing a control effect that tends to change the control force an amount proportionate to the rate of change of the value of the variable, said three mechanisms acting simultaneously on said control force; in combination, first adjusting means for effectively adjusting simultaneously, directly, and proportionately the actions of all three mechanisms on said control force produced in response to changes in the value of said variable, and second adjusting means for simultaneously adjusting the time constants of said second and third mechanisms to maintain predetermined relationships therebetween whereby the adjustment of said controller to said process is greatly simplified.

5. In control apparatus for establishing a control force and including responsive means continuously and proportionately responsive to the value of a variable, valve means for controlling application of energy to establish said control force, follow-up means responsive to said control force and acting in conjunction with said responsive means to operate said valve means in accordance with a proportioning band the width of which determines the amount of change of the value of a condition of said follow-up means caused by a given change of said variable, whereby said control force is caused to change in proportionate response to change of said variable, first resistor and capacitor means between said control force and said follow-up means for giving said control force a derivative control effect correction, i. e., a quantitative correction proportionate to the rate of change of said variable, control means directly opposing the action of said follow-up means and responsive to said control force through second resistor and capacitor means to cause said follow-up means to give said control force a reset control effect correction, i. e., to give said control force a rate of change proportionate to the deviation of said variable from a given control point value; in combination, adjusting means for adjusting simultaneously the time constant of said first resistor and capacitor means and the time constant of said second resistor and capacitor means to change the magnitude of the derivative and reset control effect corrections while maintaining the ratio of said time constants less than unity.

6. In control apparatus for establishing a control force and including responsive means continuously and proportionately responsive to the value of a variable, valve means for controlling application of energy to establish said control force, follow-up means responsive to said control force and acting in conjunction with said responsive means to operate said valve means in accordance with a proportioning band the width of which determines the amount of change of the value of a condition of said follow-up means caused by a given change of said variable, whereby said control force is caused to change in proportionate response to change of said variable, first resistor and capacitor means between said control force and said follow-up means for giving said control force a derivative control effect correction, i. e., a quantitative correction proportionate to the rate of change of said variable, control means directly opposing the action of said follow-up means and responsive to said control force through second resistor and capacitor means to cause said follow-up means to give said control force a reset control effect correction, i. e., to give said control force a rate of change proportionate to the deviation of said variable from a given control point value; in combination, adjusting means for adjusting simultaneously the time constant of said first resistor and capacitor means and the time constant of said second resistor and capacitor means to change the magnitude of the derivative and reset control effect corrections while maintaining between said time constants a ratio of from 0.2 to 1.0.

7. In control apparatus for establishing a pneumatic pressure and including responsive means continuously and proportionately responsive to the value of a variable, valve means for controlling application of an elastic fluid to establish said pneumatic control pressure, first motor means responsive to said pneumatic control pressure and acting in conjunction with said responsive means to operate said valve means in accordance with a proportioning band the width of which determines the amount of change of the pressure in said motor means caused by a given change of said variable, whereby said pneumatic control pressure is caused to change in proportionate response to change of said variable, first resistor and capacitor means between said pneumatic control pressure and said first motor means for giving said pneumatic control pressure a derivative control effect correction, i. e., a quantitative correction proportionate to the rate of change of said variable, second motor means directly opposing the action of said first motor means and responsive to said pneumatic control pressure through second resistor and capacitor means to cause said first motor means to give said pneumatic control pressure a reset control effect correction, i. e., to give said pneumatic control pressure a rate of change proportionate to the deviation of said variable from a given control point value; in combination, adjusting means for adjusting simultaneously the time constant of said first resistor and capacitor means and the time constant of said second resistor and capacitor means to change the magnitude of the derivative and reset control effect corrections while maintaining the ratio between said time constants within an operative range.

8. In control apparatus for establishing a pneumatic pressure and including responsive means continuously and proportionately responsive to the value of a variable, valve means for controlling application of an elastic fluid to establish said pneumatic control pressure, first motor means responsive to said pneumatic control pressure and acting in conjunction with said responsive means to operate said valve means in accordance with a proportioning band the width of which determines the amount of change of the pressure in said motor means caused by a given change of said variable, whereby said pneumatic control pressure is caused to change in proportionate response to change of said variable, first resistor and capacitor means between said pneumatic control pressure and said first motor means for giving said pneumatic control pressure a derivative control effect correction, i. e., a quantitative correction proportionate to the rate of change of said variable, second motor means directly opposing the action of said first motor means and responsive to said pneumatic control pressure through second resistor and capacitor means to cause said first motor means to give said pneumatic control pressure a reset control effect correction, i. e., to give said pneumatic control pressure a rate of change proportionate to the deviation of said variable from a neutral value; in combination, adjusting means for adjusting simultaneously the time constant of said first resistor and capacitor means and the time constant of said second resistor and capacitor means to change the magnitude of the derivative and reset control effect corrections while maintaining between said time constants a ratio of less than unity.

9. In control apparatus for establishing a pneumatic control pressure and including responsive means continuously and proportionately responsive to the value of a variable, valve means for controlling application of an elastic fluid to establish said pneumatic control pressure, first motor means responsive to said pneumatic control pressure and acting in conjunction with said responsive means to operate said valve means in accordance with a proportioning band the width of which determines the amount of change of the pressure in said motor means caused by a given change of said variable, whereby said pneumatic control pressure is caused to change in proportionate response to change of said variable, first resistor and capacitor means between said pneumatic control pressure and said first motor means for giving said pneumatic control pressure a derivative control effect correction, i. e., a quantitative correction proportionate to the rate of change of said variable, second motor means directly opposing the action of said first motor means and responsive to said pneumatic control pressure through second resistor and capacitor means to cause said first motor means to give said pneumatic control pressure a reset control effect correction, i. e., to give said pneumatic control pressure a rate of change proportionate to the deviation of said variable from a given control point value; in combination, adjusting means for adjusting simultaneously the time constant of said first resistor and capacitor means and the time constant of said second resistor and capacitor means to change the magnitude of the derivative and reset control effect corrections while maintaining between said time constants a ratio of less than unity.

10. In control apparatus for establishing a control force and including responsive means continuously and proportionately responsive to the value of a variable, valve means for controlling application of energy to establish said control force, follow-up means responsive to said control force and acting in conjunction with said responsive means to operate said valve means in accordance with a proportioning band the width of which determines the amount of change of the value of a condition of said follow-up means caused by a given change of said variable, whereby said control force is caused to change in proportionate response to change of said variable, first resistor and capacitor means between said control force and said follow-up means for giving said control force a derivative control effect correction, i. e., a quantitative correction proportionate to the rate of change of said variable, control means directly opposing the action of said follow-up means and responsive to said control force through said first resistor and capacitor means and through second resistor and capacitor means to cause said follow-up means to give said control force a reset control effect correction, i. e., to give said control force a rate of change proportionate to the deviation of said variable from a given control point value; in combination, adjusting means for adjusting simultaneously the time constant of said first resistor and capacitor means and the time constant of said second resistor and capacitor means to change the magnitude of the derivative and reset control effect corrections while maintaining between said time constants a ratio less than unity.

11. In control apparatus for establishing a pneumatic control pressure and including responsive means continuously and proportionately responsive to the value of a variable, valve means for controlling application of air to establish said pneumatic control pressure, first bellows movable in response to said pneumatic control pressure and acting in conjunction with said responsive means to operate said valve means in accordance with a proportioning band the width of which determines the amount of change of the pressure in said bellows caused by a given change of said variable, whereby said pneumatic control pressure is caused to change in proportionate response to change of said variable, first resistance between said pneumatic control pressure and said bellows for giving said pneumatic control pressure a derivative control effect correction, i. e., a quantitative correction proportionate to the rate of change of said variable, second bellows directly opposing the action of said first bellows and responsive to said pneumatic control pressure through said first resistance and through a second resistance to cause said first bellows to give said pneumatic control pressure a reset control effect correction, i. e., to give said pneumatic control pressure a rate of change proportionate to the deviation of said variable from a given control point value; in combination, adjusting means for adjusting simultaneously the time constant of said first resistance and the volume associated with it and the time constant of said second resistance and the volume associated with it to change the magnitude of the derivative and reset control effect corrections while maintaining a predetermined ratio between said time constants, said adjusting means including a plurality of shut-off valves the intakes of which are all connected in series to said first bellows, and the output of the first of which is connected through said second resistance with the second motor means and is connected with the output of the second shut-off valve through a third resistance and the output of the second shut-off valve is connected to the output of the third shut-off valve through a fourth resistance, etc., and the outputs of the second, third, etc., shut-off valves each being directly connected respectively to first, second, etc., capacity tanks whereby when any one shut-off valve is open and the others closed, the capacity tank connected to the output of said open shut-off valve is directly connected with said first bellows and said second bellows is connected to said capacity tank through such resistances and capacity tanks as are connected to the shut-off valves located between the open shut-off valve and the first bellows.

12. In control apparatus for adjusting simultaneously in steps and in the same direction time constants associated with a first motor means and a second motor means; in combination, a variable pneumatic pressure, first resistor means between said pneumatic pressure and said first motor means, a plurality of shut-off valves the input sides of which are connected without restriction with the output of said resistor means, separate capacitor means respectively connected with the outputs of the respective valves, and resistor means respectively effectively connecting the outputs of said respective valves in series and in series with said second motor means whereby when any one of said valves is opened and the others closed, the first motor means is connected directly with the capacitor connected to the output of the opened valve, and the second motor means is connected with the first motor means through the resistors and capacitors interposed between said opened valve and said second motor means.

13. In control apparatus for adjusting simultaneously in steps and in the same direction time constants of two interconnected pneumatic systems including respectively first and second motor means, in combination, a source of variable pneumatic pressure, resistor means between said pneumatic pressure and said first motor means, a plurality of shut-off valves the input sides of which are connected with the output of said resistor means and with said first motor means, separate capacitor means respectively connected with the outputs of the respective valves, and resistor means respectively connecting the outputs of said respective valves in series and in series with said second motor means, whereby when any one of said valves is opened and the others closed the capacitor associated with said valve is added to the system of the first motor means, and the capacitors interposed between said opened valve and the second motor means are added to the system of said second motor means.

14. In control apparatus for adjusting simultaneously in steps and in the same direction time constants of two interconnected pneumatic systems including respectively first and second motor means, in combination, a source of variable pneumatic pressure, resistor means between said pneumatic pressure and said first motor means, a plurality of shut-off valves the input sides of which are connected with the output of said resistor means and with said first motor means, separate capacitor means respectively connected with the outputs of the respective valves, and resistor means respectively connecting the outputs of said respective valves in series and in series with said second motor means, whereby when any one of said valves is opened and the others closed the capacitor associated with said valve is added to the system of the first motor means, and the capacitors interposed between said opened valve and the second motor means are added to the system of said second motor means and the values of the said resistor means respectively connecting the outputs of the said respective valves increasing in steps from the resistor nearest said second motor means to that farthest from said second motor means.

15. In control apparatus continuously responsive to the changes of a primary element and including valve means for controlling the application of energy to establish an operating force to operate said apparatus, follow-up means responsive to said operating force and acting in conjunction with said primary element to operate said valve means, whereby said operating force is caused to change in proportionate response to change of said primary element, first resistor and capacitor means between said operating force and said follow-up means for giving said operating force a derivative control effect correction, i. e., a quantitative correction proportionate to the rate of change of said primary element, control means opposing the action of said follow-up means and responsive to said operating force through second resistor and capacitor means to cause said follow-up means to give said operating force a reset control effect correction, i. e., to give said operating force a rate of change proportionate to the deviation of said primary element from a neutral value; in combination, means for simultaneously adjusting the time constant of said first resistor and capacitor means and the time constant of said second resistor and capacitor means to change the magnitudes of the derivative and reset control effects while maintaining the ratio of said time constants less than unity.

16. In control apparatus for establishing a control force and including responsive means continuously and proportionately responsive to the value of a variable, valve means for controlling application of energy to establish said control force, follow-up means responsive to said control force and acting in conjunction with said responsive means to operate said valve means in accordance with a proportioning band the width of which determines the amount of change of the value of a condition of said follow-up means caused by a given change of said variable, whereby said control force is caused to change in proportionate response to change of said variable, first resistor and capacitor means between said control force and said follow-up means for giving said control force a derivative control effect correction, i. e., a quantitative correction proportionate to the rate of change of said variable, control means directly opposing the action of said follow-up means and responsive to said control force through second resistor and capacitor means to cause said follow-up means to give said control force a reset control effect correction, i. e., to give said control force a rate of change proportionate to the deviation of said variable from a given control point value; in combination, step adjusting means for adjusting in steps the time constants of said first resistor and capacitor means and said second resistor and capacitor means to change in steps the magnitudes of the derivative and reset control effect corrections, and the values of the reset time constants of the step adjustments being selected to cover the range of slowness of processes to which the controller may be applied, and the value of the derivative time constant for each step adjustment being made sufficiently small to prevent the derivative effect from over controlling those processes having a degree of slowness lying between any given step adjustment and the next step adjustment having the next smallest reset time constant.

17. In control apparatus for establishing a control force and including responsive means continuously and proportionately responsive to the value of a variable, valve means for controlling application of energy to establish said control force, follow-up means responsive to said control force and acting in conjunction with said responsive means to operate said valve means in accordance with a proportioning band the width of which determines the amount of change of the value of a condition of said follow-up means caused by a given change of said variable, whereby said control force is caused to change in proportionate response to change of said variable, first resistor and capacitor means between said control force and said follow-up means for giving said control force a derivative control effect correction, i. e., a quantitative correction proportionate to the rate of change of said variable, control means directly opposing the action of said follow-up means and responsive to said control force through second resistor and capacitor means to cause said follow-up means to give said control force a reset control effect correction, i. e., to give said control force a rate of change proportionate to the deviation of said variable from a given control point value; in combination, step adjusting means for adjusting in steps the time constants of said first resistor and capacitor means and said second resistor and capacitor means to change in steps the magnitudes of the derivative and reset control effect corrections, and the value of the reset time constants of the step adjustments being selected to cover the range of slowness of processes to which the controller may be applied, and the value of the derivative time constant for each step adjustment being made sufficiently small to prevent the derivative effect from over controlling those processes having a degree of slowness lying between any given step adjustment and the next step adjustment having the next smallest reset time constant, and the values of said derivative and reset time constants for each step being so selected that the ratios of the derivative and reset time constants for each step adjustment are progressively less from the step which provides the fastest reset adjustment to the step which provides the slowest reset adjustment.

18. In apparatus for controlling liquid level in a tank by varying a liquid flow affecting said level in accordance with a control force, and including responsive means continuously and proportionately responsive to the value of said level, valve means for controlling application of energy to establish said control force, follow-up means responsive to said control force, and acting in conjunction with said responsive means to operate said valve means in accordance with a proportioning band the width of which determines the amount of change of the value of a condition of said follow-up means caused by a given change of said level, whereby said control force is caused to change in proportionate response to change of said level, first resistor and capacitor means between said control force and said follow-up means for giving said control force, a derivative control effect correction, i. e., a quantitative correction proportionate to the rate of change of said level, control means directly opposing the action of said follow-up means and responsive to said control force through second resistor and capacitor means to cause said follow-up means to give said control force a reset control effect correction, i. e., to give said control force a rate of change proportionate to the deviation of said level from a control point value; in combination, adjusting means for adjusting simultaneously the time constant of said first resistor and capacitor means and the time constant of said second resistor and capacitor means to change the magnitude of the derivative and reset control effect corrections while maintaining the ratio of said time constants less than unity.

19. In control apparatus for establishing a pneumatic pressure and including responsive means continuously and proportionately responsive to the value of a variable, valve means for controlling application of an elastic fluid to establish said pneumatic control pressure, first motor means responsive to said pneumatic control pressure and acting in conjunction with said responsive means to operate said valve means in accordance with a proportioning band the width of which determines the amount of change of the pressure in said motor means caused by a given change of said variable, whereby said pneumatic control pressure is caused to change in proportionate response to change of said variable, first resistor and capacitor means between said pneumatic control pressure and said first motor means for giving said pneumatic control pressure a derivative control effect correction, i. e., a quantitative correction proportionate to the rate of change of said variable, second motor means directly opposing the action of said first motor means and responsive to said pneumatic control pressure through second resistor and capacitor means to cause said first motor means to give said pneumatic control pressure a reset control effect correction, i. e., to give said pneumatic control pressure a rate of change proportionate to the deviation of said variable from a given control point value; in combination, adjusting means for adjusting simultaneously the time constant of said first resistor and capacitor means and the time constant of said second resistor and capacitor means to change the magnitude of the derivative and reset control effect corrections while maintaining within a desired range the ratio between the derivative and reset time constants, and said adjusting means being so constructed and arranged as to progressively reduce said ratio as the reset time constant is increased.

GEORGE A. PHILBRICK.

Certificate of Correction

Patent No. 2,360,889.   October 24, 1944.

GEORGE A. PHILBRICK

It is hereby certified that errors appear in the printed specification of the above numbered patent requiring correction as follows: Page 12, second column, line 8, for "greater" read *given*; page 13, second column, line 46, for "when" read *then*; and that the said Letters Patent should be read with these corrections therein that the same may conform to the record of the case in the Patent Office.

Signed and sealed this 30th day of April, A. D. 1946.

[SEAL]

LESLIE FRAZIER,
*First Assistant Commissioner of Patents.* amount of change of the value of a condition of said follow-up means caused by a given change of said level, whereby said control force is caused to change in proportionate response to change of said level, first resistor and capacitor means between said control force and said follow-up means for giving said control force, a derivative control effect correction, i. e., a quantitative correction proportionate to the rate of change of said level, control means directly opposing the action of said follow-up means and responsive to said control force through second resistor and capacitor means to cause said follow-up means to give said control force a reset control effect correction, i. e., to give said control force a rate of change proportionate to the deviation of said level from a control point value; in combination, adjusting means for adjusting simultaneously the time constant of said first resistor and capacitor means and the time constant of said second resistor and capacitor means to change the magnitude of the derivative and reset control effect corrections while maintaining the ratio of said time constants less than unity.

19. In control apparatus for establishing a pneumatic pressure and including responsive means continuously and proportionately responsive to the value of a variable, valve means for controlling application of an elastic fluid to establish said pneumatic control pressure, first motor means responsive to said pneumatic control pressure and acting in conjunction with said responsive means to operate said valve means in accordance with a proportioning band the width of which determines the amount of change of the pressure in said motor means caused by a given change of said variable, whereby said pneumatic control pressure is caused to change in proportionate response to change of said variable, first resistor and capacitor means between said pneumatic control pressure and said first motor means for giving said pneumatic control pressure a derivative control effect correction, i. e., a quantitative correction proportionate to the rate of change of said variable, second motor means directly opposing the action of said first motor means and responsive to said pneumatic control pressure through second resistor and capacitor means to cause said first motor means to give said pneumatic control pressure a reset control effect correction, i. e., to give said pneumatic control pressure a rate of change proportionate to the deviation of said variable from a given control point value; in combination, adjusting means for adjusting simultaneously the time constant of said first resistor and capacitor means and the time constant of said second resistor and capacitor means to change the magnitude of the derivative and reset control effect corrections while maintaining within a desired range the ratio between the derivative and reset time constants, and said adjusting means being so constructed and arranged as to progressively reduce said ratio as the reset time constant is increased.

GEORGE A. PHILBRICK.

Certificate of Correction

Patent No. 2,360,889.　　　　　　　　　　　　　　October 24, 1944.

GEORGE A. PHILBRICK

It is hereby certified that errors appear in the printed specification of the above numbered patent requiring correction as follows: Page 12, second column, line 8, for "greater" read *given*; page 13, second column, line 46, for "when" read *then*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*